United States Patent
Yazawa et al.

(10) Patent No.: US 12,241,799 B2
(45) Date of Patent: Mar. 4, 2025

(54) LOAD SENSOR DEVICE HAVING SHOCK ABSORBER

(71) Applicant: Alps Alpine Co., Ltd., Tokyo (JP)

(72) Inventors: Hisayuki Yazawa, Niigata-ken (JP); Tatsuru Ikarashi, Niigata-ken (JP); Hisanobu Okawa, Niigata-ken (JP); Ayako Otsuka, Niigata-ken (JP); Daisuke Tsuchiya, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 115 days.

(21) Appl. No.: 18/074,339

(22) Filed: Dec. 2, 2022

(65) Prior Publication Data

US 2023/0236075 A1    Jul. 27, 2023

(30) Foreign Application Priority Data

Jan. 26, 2022    (JP) ................. 2022-010395

(51) Int. Cl.
   G01L 1/18    (2006.01)
(52) U.S. Cl.
   CPC ..................... G01L 1/18 (2013.01)
(58) Field of Classification Search
   CPC ....... G01L 1/18; G01L 1/2293; G01L 1/2206; G01L 1/26; G01L 1/2237; G01L 5/0038; G01L 5/0071; G01L 5/226; G01L 5/22; B81B 3/0018; B81B 3/0075; B81B 3/0072; B81B 3/0078
   See application file for complete search history.

(56) References Cited

U.S. PATENT DOCUMENTS

| | | | | |
|---|---|---|---|---|
| 6,250,614 B1* | 6/2001 | Akatsu | .......... | F16F 13/264 |
| | | | | 267/140.13 |
| 6,327,024 B1* | 12/2001 | Hayashi | .......... | G03F 7/70358 |
| | | | | 355/33 |
| 6,615,672 B2* | 9/2003 | Stalnaker | .......... | G01L 5/0038 |
| | | | | 73/818 |
| 7,234,359 B2* | 6/2007 | Hirose | .......... | G01L 1/2231 |
| | | | | 73/777 |

(Continued)

FOREIGN PATENT DOCUMENTS

| | | |
|---|---|---|
| JP | 2926970 | 7/1999 |
| JP | 2001-281074 | 10/2001 |
| JP | 2015-152429 | 8/2015 |

*Primary Examiner* — Tran M. Tran
(74) *Attorney, Agent, or Firm* — Beyer Law Group LLP

(57) ABSTRACT

A load sensor device includes a load sensor that has a pressure receiver, a housing that accommodates the load sensor, an elastic member that receives a load and presses against the load sensor, and a pressing member that is provided between the elastic member and the load sensor. The pressing member has a rigid presser capable of coming into contact with the pressure receiver, and an elastic supporter that supports the rigid presser on the housing. A gap is provided between the rigid presser and the pressure receiver in a state where the load is not applied to the elastic member. The elastic supporter elastically deforms to reduce the gap between the rigid presser and the pressure receiver when the load is applied to the elastic member. The load sensor device further includes a shock absorber capable of alleviating elastic deformation of the elastic supporter.

14 Claims, 20 Drawing Sheets

(56) References Cited

U.S. PATENT DOCUMENTS

| | | | | |
|---|---|---|---|---|
| 7,343,223 | B2* | 3/2008 | Miura | G01L 1/26 901/34 |
| 7,506,548 | B2* | 3/2009 | Fukuda | G01L 19/0069 73/756 |
| 7,571,647 | B2* | 8/2009 | Takemasa | G01P 15/18 73/493 |
| 7,637,174 | B2* | 12/2009 | Hirabayashi | G01L 1/26 73/862.041 |
| 7,726,197 | B2* | 6/2010 | Selvan | G01L 1/18 73/777 |
| 7,832,284 | B2* | 11/2010 | Hayakawa | G01L 1/26 73/862.046 |
| 7,880,247 | B2* | 2/2011 | Vaganov | G06F 3/0338 257/730 |
| 8,044,929 | B2* | 10/2011 | Baldo | H01H 13/785 345/161 |
| 8,113,065 | B2* | 2/2012 | Ohsato | G01L 1/18 29/610.1 |
| 8,196,477 | B2* | 6/2012 | Ohsato | G01L 1/18 73/766 |
| 8,350,345 | B2* | 1/2013 | Vaganov | G06F 3/0338 257/419 |
| 8,448,531 | B2* | 5/2013 | Schneider | G01L 1/26 73/862.641 |
| 8,659,101 | B2* | 2/2014 | Yamanaka | G01P 15/125 257/419 |
| 8,820,179 | B2* | 9/2014 | Umetsu | G01L 5/223 73/862.041 |
| 8,875,584 | B2* | 11/2014 | Sasajima | G01L 1/005 73/774 |
| 8,981,247 | B2* | 3/2015 | Sano | H01H 13/14 200/534 |
| 9,016,144 | B2* | 4/2015 | Bente, IV | G01L 1/2231 73/862.53 |
| 9,032,818 | B2* | 5/2015 | Campbell | B81C 1/00134 73/862.628 |
| 9,164,003 | B2* | 10/2015 | Wade | G01L 19/0618 |
| 9,377,372 | B2* | 6/2016 | Ogawa | G01L 1/2206 |
| 9,664,576 | B2* | 5/2017 | Sato | G01L 1/2225 |
| 9,714,875 | B2* | 7/2017 | Ayon | G01L 1/16 |
| 9,823,144 | B2* | 11/2017 | Fujisawa | G01L 1/2231 |
| 9,970,831 | B2* | 5/2018 | Shih | G01P 15/123 |
| 9,983,084 | B2* | 5/2018 | Pavone | G01L 19/14 |
| 10,126,183 | B2* | 11/2018 | Campbell | G06F 3/041 |
| 10,162,425 | B2* | 12/2018 | Nakamura | H01H 13/78 |
| 10,254,187 | B2* | 4/2019 | Okawa | G01L 19/0654 |
| 10,365,175 | B2* | 7/2019 | Hosoi | G01L 5/0038 |
| 10,444,862 | B2* | 10/2019 | Schediwy | G06F 3/0445 |
| 10,488,284 | B2* | 11/2019 | Jentoft | G01L 1/02 |
| 10,595,748 | B2* | 3/2020 | Kubiak | A61B 5/746 |
| 10,894,311 | B2* | 1/2021 | Yamashita | B25F 5/00 |
| 11,015,992 | B2* | 5/2021 | Okawa | G01L 1/26 |
| 11,052,527 | B2* | 7/2021 | Yamashita | B25F 5/001 |
| 11,073,943 | B2* | 7/2021 | Franke | G06F 3/04166 |
| 11,105,692 | B2* | 8/2021 | Tung | G01L 1/2293 |
| 11,137,299 | B2* | 10/2021 | Abbasi Gavarti | H10N 30/03 |
| 11,137,311 | B2* | 10/2021 | Di Leo | G01L 19/0618 |
| 11,154,975 | B2* | 10/2021 | Tsutsui | B25F 5/001 |
| 11,175,192 | B2* | 11/2021 | Chen | G01L 1/18 |
| 11,199,459 | B2* | 12/2021 | Uchida | G01L 1/2287 |
| 11,300,397 | B2* | 4/2022 | Kim | G01L 1/2231 |
| 11,579,028 | B2* | 2/2023 | Tsai | G01L 1/16 |
| 11,579,727 | B2* | 2/2023 | Franke | G01L 1/26 |
| 11,747,226 | B2* | 9/2023 | Wade | G01L 1/2206 73/727 |
| 11,786,180 | B2* | 10/2023 | Kang | A61B 5/7485 600/301 |
| 11,830,686 | B2* | 11/2023 | Fehling | H01H 13/30 |
| 11,851,319 | B2* | 12/2023 | Pomarico | B60T 8/17 |
| 11,860,050 | B2* | 1/2024 | Mei | G01L 1/142 |
| 11,874,183 | B2* | 1/2024 | Dueweke | G01L 25/00 |
| 11,874,185 | B2* | 1/2024 | Tsai | G01L 1/26 |
| 11,953,932 | B2* | 4/2024 | Luu | G01L 5/225 |
| 12,003,196 | B2* | 6/2024 | Kim | G06F 3/041 |
| 12,026,316 | B2* | 7/2024 | Takahashi | B06B 1/04 |
| 2002/0180019 | A1* | 12/2002 | Saito | H01L 23/057 257/730 |
| 2006/0153556 | A1* | 7/2006 | Lee | G02B 7/08 396/133 |
| 2009/0235760 | A1* | 9/2009 | Hayakawa | G01L 1/20 73/862.046 |
| 2017/0233245 | A1* | 8/2017 | Duqi | G01L 9/0054 257/419 |
| 2017/0284886 | A1* | 10/2017 | Okawa | B29C 45/0082 |
| 2018/0024648 | A1* | 1/2018 | Watanabe | G06F 3/0354 345/174 |
| 2018/0238749 | A1* | 8/2018 | Doko | G01L 1/26 |
| 2022/0307927 | A1* | 9/2022 | Okawa | G01L 1/18 |
| 2023/0085965 | A1* | 3/2023 | Jacobs | G01L 1/044 |

* cited by examiner

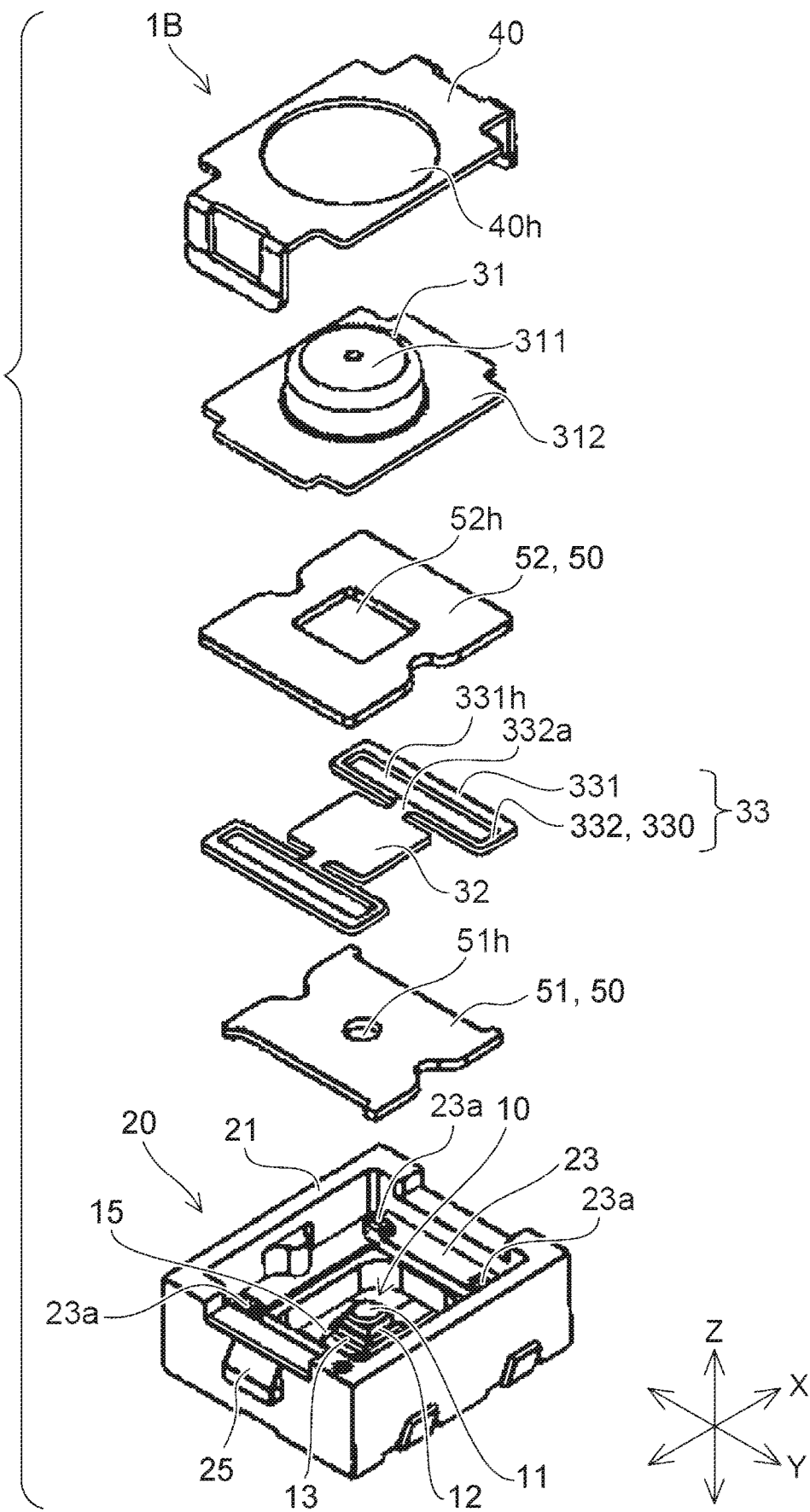

LOAD SENSOR DEVICE HAVING SHOCK ABSORBER

CLAIM OF PRIORITY

This application claims benefit of Japanese Patent Application No. 2022-010395 filed on Jan. 26, 2022, which is hereby incorporated by reference.

BACKGROUND OF THE INVENTION

1. Field of the Invention

The present invention relates to load sensor devices that detect loads.

2. Description of the Related Art

In recent years, load sensor devices that detect loads in, for example, electronic apparatuses have been widely used. Japanese Unexamined Patent Application Publication No. 2015-152429 discloses a pressure sensor including: a pressure-sensitive element that has a pressure-sensitive surface provided with a first electrode and a second electrode and in which an electrical property value between the first electrode and the second electrode changes in accordance with pressure applied to the pressure-sensitive surface; a pressing member having electrical conductivity; and a supporter that supports the pressing member such that one end of the pressing member comes into contact with the first electrode of the pressure-sensitive element when a load of a predetermined value or more is applied to the pressing member toward the first electrode of the pressure-sensitive element. The pressure sensor is used in a manner such as to determine whether or not a load is applied to the pressing member based on a measurement result of the electrical property value between the pressing member and the second electrode of the pressure-sensitive element.

Japanese Unexamined Patent Application Publication No. 2001-281074 discloses a load detection device including a magneto-strictive load sensor that magnetizes a magnetic member by applying an electric current to a coil, changes the magnetic properties of the magnetic member by applying a load thereto, converts the change in the magnetic properties into a voltage change, and outputs the voltage change so as to detect a load. In this load detection device, the magneto-strictive load sensor or a load detection system including the magneto-strictive load sensor is provided with an excessive-load prevention mechanism that includes an elastic member.

Japanese Patent No. 2926970 discloses a panel switch constituted of a switch unit, a button, and a damper sheet. The switch unit is formed by bonding a diaphragm onto a horseshoe-shaped contact and a substantially-circular contact adjacent to the inner side thereof by using tape. The horseshoe-shaped contact is provided on an insulative substrate or an insulative sheet. The diaphragm has spring properties and is composed of metal. The diaphragm is bonded concentrically with and in contact with the horseshoe-shaped contact. The button has a lower surface provided with a rod that presses against the center of the diaphragm. The damper sheet is composed of silicon rubber or a foamed material sandwiched between the diaphragm of the switch unit and the rod of the button.

A load sensor device that detects a load requires high detection accuracy and linearity in load detection values and preferably has resistance to an impact that may possibly be applied during a manufacturing process or during use.

In view of the circumstances mentioned above, the present invention provides a load sensor device that can achieve both high detection accuracy and excellent impact resistance.

SUMMARY OF THE INVENTION

As a result of studies performed from the standpoint of achieving high detection accuracy, the present inventors have obtained knowledge indicating that it is better to keep a member (pressing member) that presses against a pressure receiver of a load sensor when a load is applied out of contact with the pressure receiver in a no-load state. However, it has become clear that, with the pressing member and the pressure receiver being out of contact with each other in a no-load state, the pressing member and the pressure receiver collide with each other when an impact is received from the outside, possibly damaging the load sensor due to this collision. New knowledge obtained as a result of further studies indicates that, when a rigid pressing member is displaced toward the pressure receiver in a load applied state, the possibility of the load sensor being damaged when receiving the aforementioned impact can be reduced by alleviating excessive deformation and a deformation rate of a member that elastically supports the rigid pressing member.

An aspect of the present invention completed based on the above knowledge provides a load sensor device including a load sensor that has a pressure receiver, a housing that accommodates the load sensor, an elastic member that receives a load and presses against the load sensor, and a pressing member that is provided between the elastic member and the load sensor. The pressing member has a rigid presser capable of coming into contact with the pressure receiver, and an elastic supporter that supports the rigid presser on the housing. A gap is provided between the rigid presser and the pressure receiver in a state where the load is not applied to the elastic member. The elastic supporter elastically deforms to reduce the gap between the rigid presser and the pressure receiver when the load is applied to the elastic member. The load sensor device further includes a shock absorber capable of alleviating elastic deformation of the elastic supporter.

With such a configuration, the pressing member is given elasticity, so that when the elastic member is pressed, the load can be transmitted from the elastic member to the pressure receiver via the elastic supporter and the rigid presser. In this load sensor device, when an impact is applied to the pressing member, the shock absorber alleviates the elastic deformation of the elastic supporter, so that the displacement rate of the rigid presser is reduced, whereby an impact force transmitted from the rigid presser to the pressure receiver can be alleviated.

In the aforementioned load sensor device, the elastic supporter may have a plate spring extending from the rigid presser in a direction intersecting a load application direction. Moreover, the plate spring may be provided integrally with the rigid presser. Accordingly, the elastic supporter has the plate spring extending from the rigid presser in the direction intersecting the load application direction, so that the rigid presser can be supported in a stable and space-saving manner, as compared with a coil spring, and the load can be readily transmitted to the pressure receiver.

In the aforementioned load sensor device, the shock absorber may have a first soft elasticity member disposed at a side where the pressing member faces the load sensor. Accordingly, when an impact is applied to the pressing member, the elastically-deforming elastic supporter comes into contact with the first soft elasticity member so that the elastic deformation of the elastic supporter can be alleviated.

In the aforementioned load sensor device, the first soft elasticity member preferably has a first through-hole, and the rigid presser and the pressure receiver are preferably capable of coming into contact with each other via the first through-hole in a state where the load is applied to the elastic member. Accordingly, even if the first soft elasticity member is provided at the side where the pressing member faces the load sensor, the rigid presser and the pressure receiver are capable of directly coming into contact with each other via the first through-hole when the rigid presser comes into contact with the pressure receiver, so that the load of the pressing member can be transmitted to the pressure receiver without the intervention of the first soft elasticity member.

In the aforementioned load sensor device, the shock absorber may have a second soft elasticity member disposed at a side where the plate spring faces the elastic member. Accordingly, when an impact is applied to the pressing member, the elastically-deforming elastic supporter comes into contact with the second soft elasticity member so that the elastic deformation of the elastic supporter can be alleviated.

In the aforementioned load sensor device, the second soft elasticity member preferably has a second through-hole, and the elastic member or a member disposed between the elastic member and the rigid presser preferably comes into contact with the rigid presser via the second through-hole in a state where the load is applied to the elastic member. Accordingly, even if the second soft elasticity member is provided at the side where the plate spring faces the elastic member, the elastic member or the member disposed between the elastic member and the rigid presser is capable of directly coming into contact with the rigid presser via the second through-hole, so that the load can be transmitted from the elastic member to the pressing member without the intervention of the second soft elasticity member.

In the aforementioned load sensor device, the shock absorber may have a shock absorbable section composed of a fluid material within the housing. Accordingly, the displacement rate of the rigid presser is reduced by the section composed of the fluid material, so that an impact force transmitted from the rigid presser to the pressure receiver can be alleviated.

In the aforementioned load sensor device, the housing may have a stopper that regulates a deformation amount of the elastic member in a load application direction in a state where the load is applied to the elastic member. Accordingly, the deformation amount of the elastic member is regulated by the stopper when an excessive load is applied to the elastic member, so that the load sensor can be protected from the excessive load.

In the aforementioned load sensor device, a periphery of the pressing member may be secured to the housing. Accordingly, the periphery of the pressing member is supported by the housing, so that the pressing member can be displaced such that the central area thereof bends about the periphery of the pressing member acting as a fulcrum.

In the aforementioned load sensor device, when viewed from a load application direction, it is preferable that the rigid presser entirely overlaps with a load receiver of the elastic member, and that the pressure receiver entirely overlaps with the rigid presser. Accordingly, a load received by the load receiver of the elastic member can be applied directly to the pressure receiver of the load sensor in the load application direction via the rigid presser.

In the aforementioned load sensor device, the load sensor may have a displacement section that is to be displaced in accordance with a load received by the pressure receiver, and a plurality of piezo-resistive elements that electrically detect a displacement amount of the displacement section. In such a load sensor that uses the plurality of piezo-resistive elements, the balance in detection values obtained by the plurality of piezo-resistive elements tends to become lost when an impact is applied to the pressure receiver. As mentioned above, the shock absorber alleviates the elastic deformation of the elastic supporter, so that an impact force applied from the rigid presser to the pressure receiver can be alleviated, whereby the balance in the detection values obtained by the plurality of piezo-resistive elements can be maintained even when an impact is applied.

In the aforementioned load sensor device, the shock absorber is preferably provided in contact with the elastic supporter. Accordingly, when the elastic supporter elastically deforms, the shock absorber can effectively alleviate the elastic deformation.

In the aforementioned load sensor device, the shock absorber may include gelatinous resin that adheres to the elastic supporter. Accordingly, when the elastic supporter elastically deforms, the gelatinous resin can effectively alleviate the elastic deformation.

In the aforementioned load sensor device, a rigid plate may be provided between the elastic member and the rigid presser. With such a rigid plate provided, relief of the load transmitted from the elastic member toward the rigid presser is suppressed, so that the detection sensitivity can be enhanced.

According to the present invention, a load sensor device that can achieve both high detection accuracy and excellent impact resistance can be provided.

BRIEF DESCRIPTION OF THE DRAWINGS

FIG. 7 is an exploded perspective view of a load sensor device according to a second embodiment;

DESCRIPTION OF THE PREFERRED EMBODIMENTS

Embodiments of the present invention will be described in detail below with reference to the appended drawings. In the following description, identical components are given the same reference signs, and descriptions of components already described once are omitted, as appropriate.

First Embodiment

Figure 1:
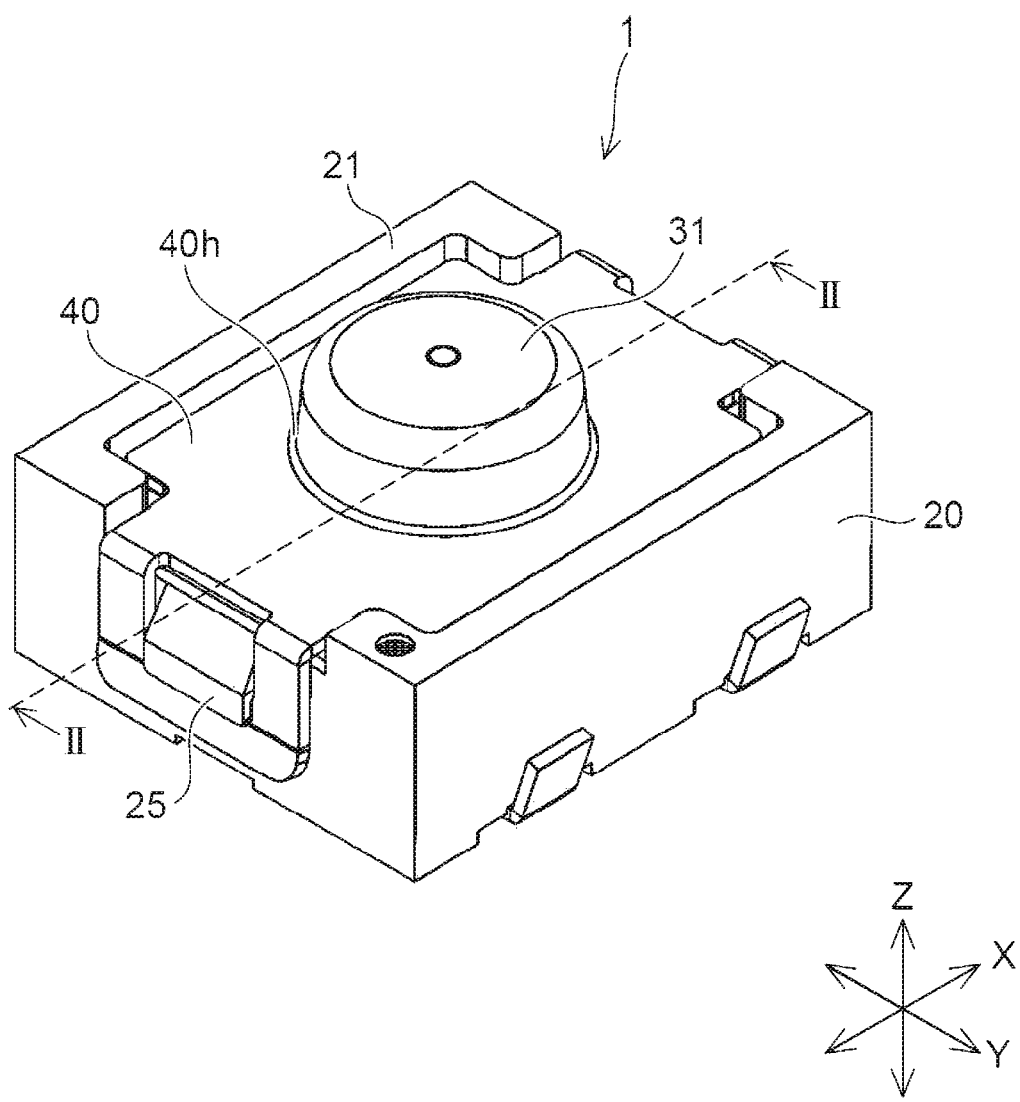
FIG. 1 is a perspective view illustrating the configuration of a load sensor device according to a first embodiment.
Figure 2:
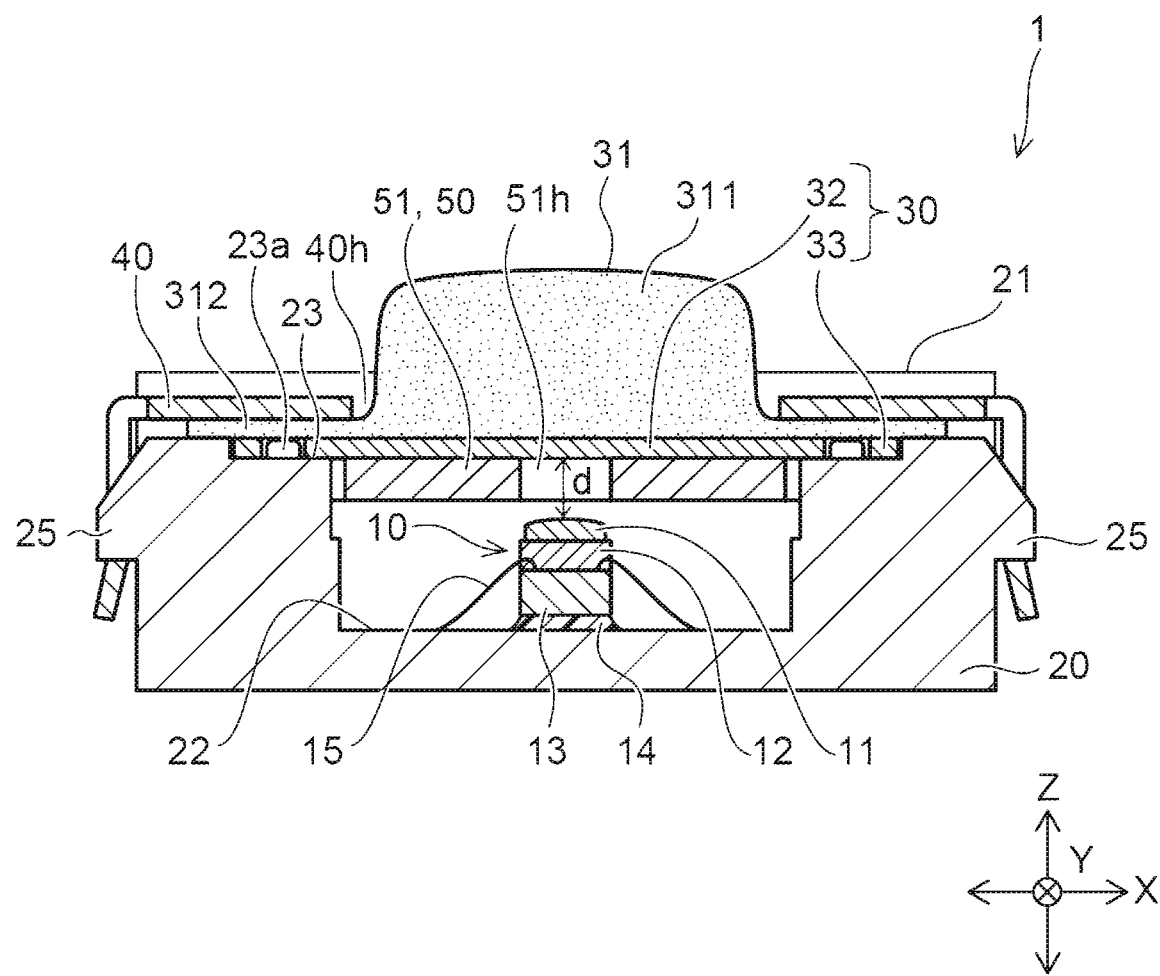
FIG. 2 is a cross-sectional view illustrating the configuration of the load sensor device according to the first embodiment, taken along line II-II in FIG. 1.
Figure 3:
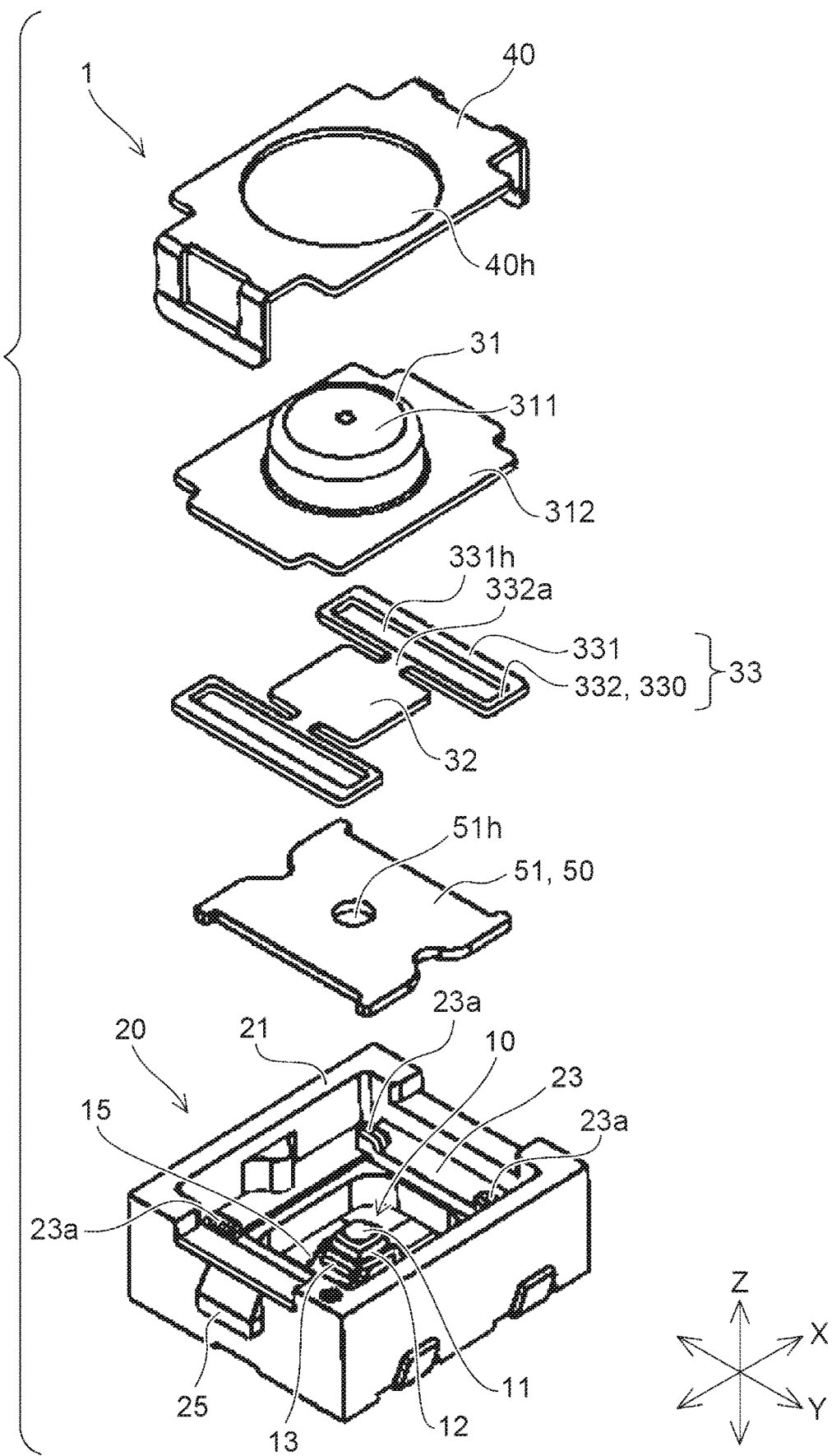
FIG. 3 is an exploded perspective view of the load sensor device according to the first embodiment.
Figure 4:
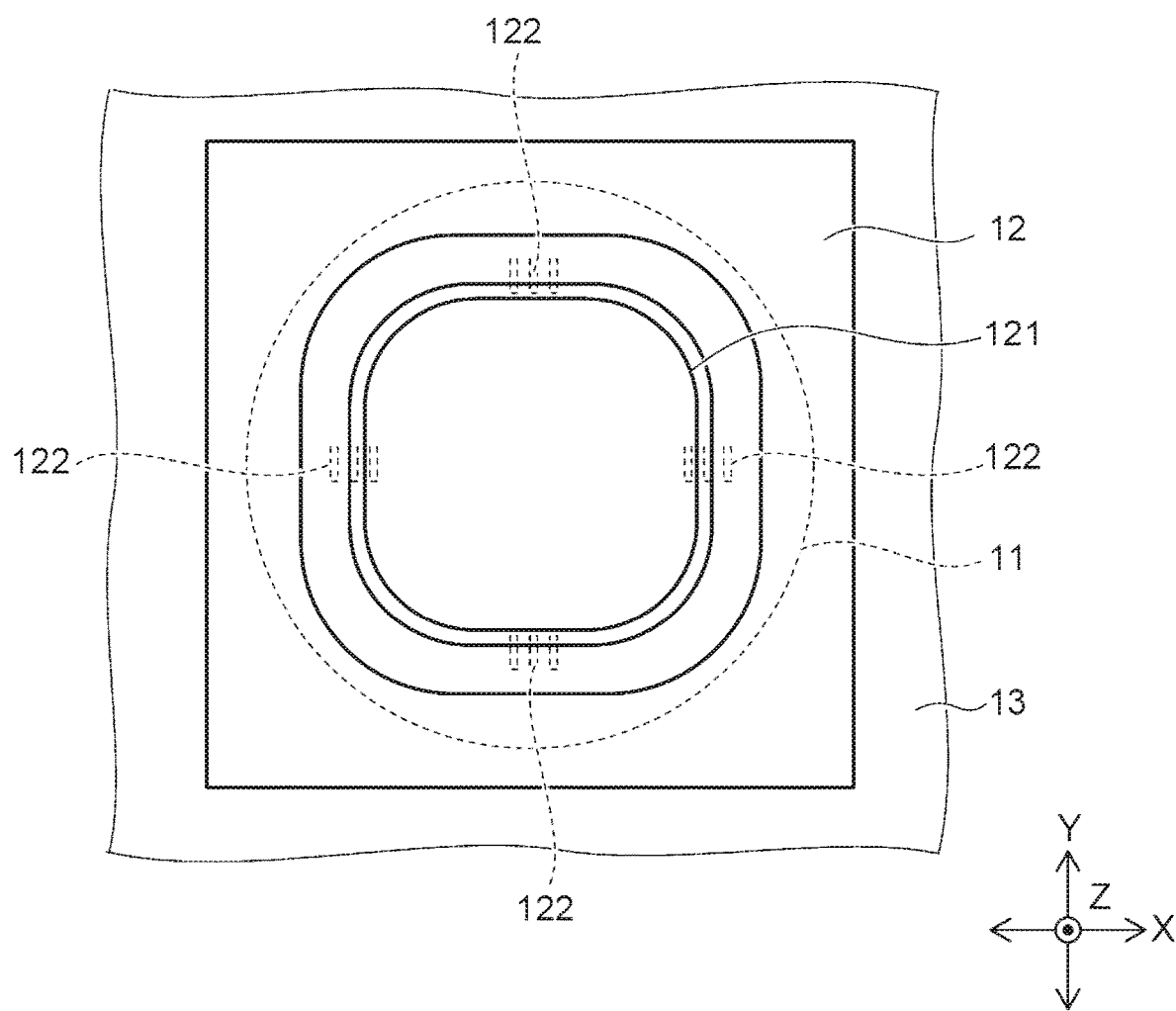
FIG. 4 is a plan view illustrating a displacement section of a load sensor.
Figure 5:
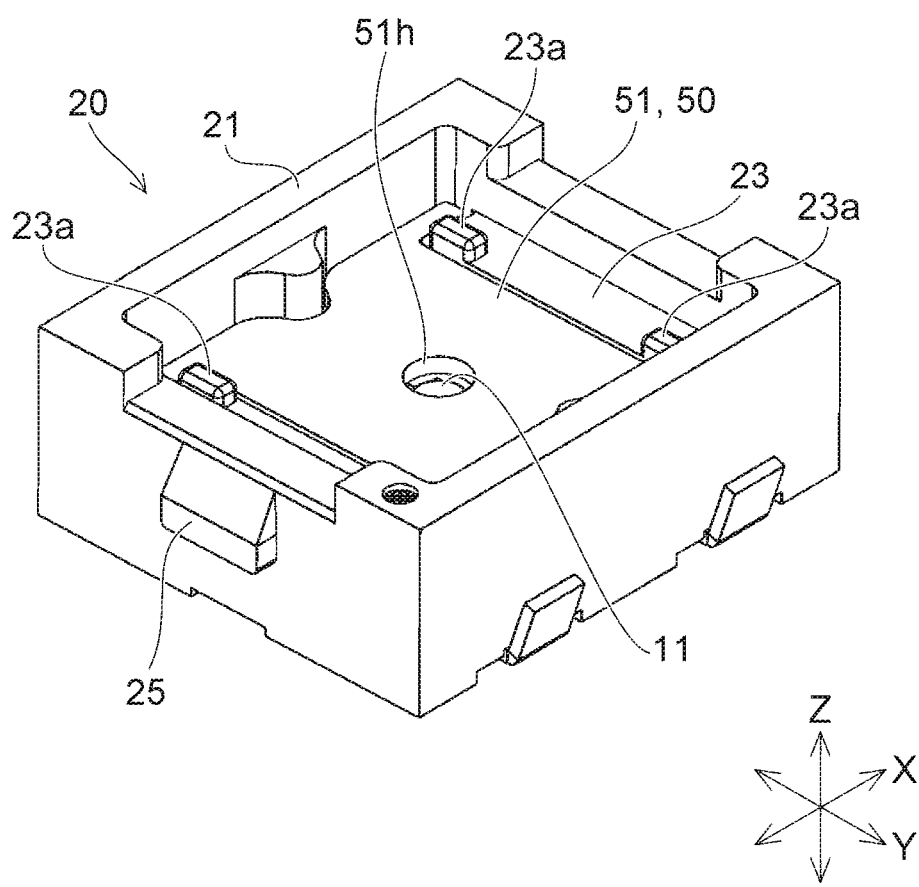
FIG. 5 is a perspective view illustrating the disposition of a shock absorber of the load sensor device according to the first embodiment.

FIG. 1 is a perspective view illustrating the configuration of a load sensor device according to a first embodiment. FIG. 2 is a cross-sectional view illustrating the configuration of the load sensor device according to the first embodiment, taken along line II-II in FIG. 1. FIG. 3 is an exploded perspective view of the load sensor device according to the first embodiment. FIG. 4 is a plan view illustrating a displacement section of a load sensor. FIG. 5 is a perspective view illustrating the disposition of a shock absorber of the load sensor device according to the first embodiment.

A load sensor device 1 according to the first embodiment receives a load from the outside and outputs a signal according to the load. The load sensor device 1 includes a load sensor 10, a housing 20 that accommodates the load sensor 10, an elastic member 31 that receives a load and presses against the load sensor 10, and a pressing member 30 provided between the elastic member 31 and the load sensor 10. In the description of each embodiment, the direction of the normal to the mounting surface of the load sensor 10 in the housing 20 is defined as a Z direction, one of the directions orthogonal to the normal direction (Z direction) is defined as an X direction, and the other direction is defined as a Y direction.

The load sensor 10 has a pressure receiver 11 and a sensor substrate 12. The pressure receiver 11 protrudes in the shape of, for example, a cylinder from the upper surface of the sensor substrate 12 and receives a load from the outside. The pressure receiver 11 is composed of a silicon compound or silicon (i.e., the same material as the sensor substrate 12).

The sensor substrate 12 may have a displacement section 121 that is to be displaced in accordance with the load received by the pressure receiver 11 and a plurality of piezo-resistive elements 122 that electrically detect the displacement amount of the displacement section 121. The sensor substrate 12 is joined onto a base substrate 13 by, for example, diffusion bonding using Au, and the base substrate 13 is connected to the housing 20 by using die-bond resin 14. The displacement section 121 is to be displaced in accordance with the load received by the pressure receiver 11 and is provided on the surface of the sensor substrate 12 opposite the pressure receiver 11.

The piezo-resistive elements 122 electrically detect the displacement amount of the displacement section 121. The displacement section 121 is provided with the plurality of piezo-resistive elements 122. The plurality of piezo-resistive elements 122 are disposed along the periphery of the displacement section 121 such that the neighboring elements are arranged at phases different from each other by 90° (i.e., have an orthogonal positional relationship with each other). When the displacement section 121 is displaced in accordance with the load received by the pressure receiver 11, the electrical resistance of the plurality of piezo-resistive elements 122 changes in accordance with the displacement amount, so that the midpoint potential of a bridge circuit constituted of the plurality of piezo-resistive elements 122 changes. This midpoint potential is output from the sensor.

The housing 20 has the shape of, for example, a box and has edge sections 21 and an accommodation section 22 serving as a recess at the center. The edge sections 21 serve as the uppermost surfaces of the housing 20 and may function as stoppers that regulate the deformation amount of the elastic member 31 in the load application direction (Z direction) when the load is received from the outside.

The load sensor 10 is accommodated in the accommodation section 22. The accommodation section 22 is provided with a pad, and the load sensor 10 accommodated therein and the pad are electrically connected to each other by a bonding wire 15. Resin (not shown) may be embedded within the accommodation section 22 for the purpose of protecting the bonding wire 15.

Steps 23 are provided within the edge sections 21 to surround the accommodation section 22. A shock absorber 50, to be described later, and a rigid presser 32 of the pressing member 30 are placed on the steps 23.

The pressing member 30 has the rigid presser 32 that is to come into contact with the pressure receiver 11, and also has an elastic supporter 33 that supports the rigid presser 32 on the housing 20. The elastic member 31 that receives the load from the outside is provided on the pressing member 30. The elastic member 31 has a protrusion 311 and a flange 312. The elastic member 31 is composed of, for example, rubber. The protrusion 311 is, for example, cylindrical, and the flange 312 has a surface for placing the protrusion 311 on the rigid presser 32.

The rigid presser 32 is a tabular member and is composed of a material more rigid than the elastic member 31. The rigid presser 32 used is, for example, a stainless plate with a thickness of about 0.2 mm. The rigid presser 32 may be composed of a silicon, ceramic, glass, or aluminum material. The rigid presser 32 has an elastic modulus higher than the elastic modulus of the elastic member 31, and preferably has an elastic modulus of 60 GPa or higher.

When viewed in the load application direction (Z direction), it is preferable that the rigid presser 32 entirely overlap with a load receiver of the elastic member 31 and that the pressure receiver 11 entirely overlap with the rigid presser 32. Accordingly, the load received by the load receiver of the elastic member 31 can be directly applied to the pressure receiver 11 of the load sensor 10 in the load application direction via the rigid presser 32.

The elastic supporter 33 has frame segments 331 and arm segments 332. The elastic supporter 33 is coupled to the rigid presser 32 by coupling portions 332*a* provided between the arm segments 332 and the rigid presser 32. Each frame segment 331 is provided with a positioning hole 331h. The steps 23 of the housing 20 on which the frame segments 331 are to be placed are provided with positioning protrusions 23a. When the frame segments 331 are placed on the steps 23, the protrusions 23a are engaged with the positioning holes 331h, so that the position of the elastic supporter 33 is set.

Each arm segment 332 is a plate spring 330 extending from the rigid presser 32 in a direction intersecting the load application direction. The rigid presser 32 is supported by elastic deformation of the arm segments 332 in accordance with a predetermined spring constant. This spring constant is adjusted in accordance with the width, the thickness, the length, and the shape of the arm segments 332 in addition to the material thereof. For example, the spring constant of the arm segments 332 of the elastic supporter 33 decreases with decreasing width of the coupling portions 332a, such that a soft sense of pre-stroke is readily obtainable. On the other hand, the spring constant of the arm segments 332 increases with increasing width of the coupling portions 332a, such that a sense of pressing is readily obtainable.

The arm segments 332 have the shape of plate springs provided symmetrically with respect to the rigid presser 32, so that the load from the elastic member 31 can be readily transmitted to the pressure receiver 11 provided directly therebelow. Furthermore, the rigid presser 32 is supported by the plate springs 330 (arm segments 332) extending in the direction intersecting the load application direction, so that the rigid presser 32 can be supported in a stable and space-saving manner, as compared with a case where the rigid presser 32 is supported by a coil spring extending in the load application direction. Alternatively, the plate springs 330 may be provided integrally with the rigid presser 32.

Furthermore, with the pressing member 30 having elasticity, the load can be transmitted from the elastic member 31 to the pressure receiver 11 of the load sensor 10 via the elastic supporter 33 and the rigid presser 32 when the elastic member 31 is pressed. Since the rigid presser 32 that is to come into contact with the pressure receiver 11 is composed of, for example, a highly-rigid material (such as metal or silicon), relief of the load is suppressed, so that the detection sensitivity can be enhanced.

In the case where the load sensor 10 obtains an output by using the bridge circuit constituted of the plurality of piezoresistive elements 122, the pressure receiver 11 of a protruding type needs to receive the load and cause the displacement section 121 to be displaced efficiently. Therefore, when the load is transmitted from the pressing member 30 to the pressure receiver 11, the load cannot be effectively transmitted to the pressure receiver 11 if the member that comes into contact with the pressure receiver 11 has low rigidity. In this embodiment, the pressure receiver 11 is pressed by the rigid presser 32, so that the relief of the load from the outside is suppressed, whereby the load can be efficiently transmitted to the pressure receiver 11.

In the load sensor device 1, a gap d is provided between the rigid presser 32 and the pressure receiver 11 in a state (no-load state) where a load (including an impact) is not applied to the elastic member 31. When a load is applied to the elastic member 31, the elastic supporter 33 elastically deforms to reduce the gap d between the rigid presser 32 and the pressure receiver 11. Then, the rigid presser 32 and the pressure receiver 11 come into contact with each other, so that the load applied to the elastic member 31 is transmitted to the load sensor 10.

The load sensor device 1 is provided with the shock absorber 50 that is capable of alleviating the elastic deformation of the elastic supporter 33. When the rigid presser 32 is displaced by the elastic deformation of the elastic supporter 33, the shock absorber 50 has a function of reducing the displacement rate thereof.

The shock absorber 50 may have a first soft elasticity member 51 disposed at a side where the pressing member 30 faces the load sensor 10. The first soft elasticity member 51 is composed of a shock absorbing material, such as silicone, synthetic rubber, urethane, or gelatinous resin, with a large loss tangent (tan δ) as a dynamic viscoelastic property.

The first soft elasticity member 51 may be provided such as to be constantly in contact with the elastic supporter 33 or to come into contact therewith when the elastic supporter 33 elastically deforms. Accordingly, when an impact is applied to the pressing member 30, the elastically-deforming elastic supporter 33 comes into contact with the first soft elasticity member 51 so that the elastic deformation of the elastic supporter 33 is alleviated, whereby the displacement rate of the rigid presser 32 can be reduced.

The first soft elasticity member 51 may have a first through-hole 51h. Accordingly, in a state where a load is applied to the elastic member 31, the rigid presser 32 and the pressure receiver 11 may be capable of coming into contact with each other via the first through-hole 51h. Specifically, even if the first soft elasticity member 51 is provided at the side where the pressing member 30 faces the load sensor 10, the rigid presser 32 and the pressure receiver 11 are capable of directly coming into contact with each other via the first through-hole 51h when the rigid presser 32 comes into contact with the pressure receiver 11, so that the load of the pressing member 30 can be transmitted to the pressure receiver 11 without the intervention of the first soft elasticity member 51.

In the load sensor device 1 according to this embodiment, the displacement rate of the rigid presser 32 can be reduced by the shock absorber 50 when an impact is applied to the pressing member 30, so that an impact load applied to the pressure receiver 11 of the load sensor 10 can be alleviated. Accordingly, this can enhance the impact-load resistance of the load sensor 10. Furthermore, when a normal load is applied, the rigid presser 32 and the pressure receiver 11 directly come into contact with each other via the first through-hole 51h, so that the load is efficiently transmitted to the pressure receiver 11, thereby enabling highly-accurate load detection.

Assembly of Load Sensor Device

In the above configuration, the load sensor 10 is accommodated in the accommodation section 22 of the housing 20, and the load sensor 10 and the pad in the accommodation section 22 are connected to each other by the bonding wire 15. The first soft elasticity member 51, which is sheet-like, serving as the shock absorber 50 is disposed on the steps 23 of the accommodation section 22. The first through-hole 51h in the first soft elasticity member 51 is located in alignment with the pressure receiver 11, as viewed in the Z direction. The pressing member 30 is placed on the first soft elasticity member 51. Moreover, the elastic member 31 is placed on the rigid presser 32.

In this state, the housing 20 is covered with a frame 40. The frame 40 is secured by being hooked onto hooks 25 provided at side surfaces of the housing 20. A hole 40h is provided at the center of the frame 40. When the housing 20 is covered with the frame 40, the protrusion 311 protrudes upward through the hole 40h. The flange 312 of the elastic member 31 is pressed by the frame 40. Accordingly, the pressing member 30 is secured to the housing 20.

In the load sensor device 1 assembled in this manner, the gap d is provided between the rigid presser 32 and the pressure receiver 11 in a state where a load is not applied to the pressing member 30. Specifically, the surface of the rigid presser 32 facing the pressure receiver 11 is not in contact with the pressure receiver 11. With the gap d provided between the rigid presser 32 and the pressure receiver 11, an assembly tolerance can be provided.

Specifically, when the rigid presser 32 and the pressure receiver 11 are in contact with each other or are close to being in contact with each other, the rigid presser 32 and the pressure receiver 11 may possibly collide with each other due to, for example, a dimensional error and assembly misalignment between the components. A collision of a highly-rigid object, such as the rigid presser 32, with the pressure receiver 11 may possibly have an adverse effect on the load sensor 10. With the gap d being provided between the rigid presser 32 and the pressure receiver 11, as in this embodiment, a collision can be avoided in a positive manner during the assembly process, thereby protecting the load sensor 10.

Operation of Load Sensor Device

Figure 6A:
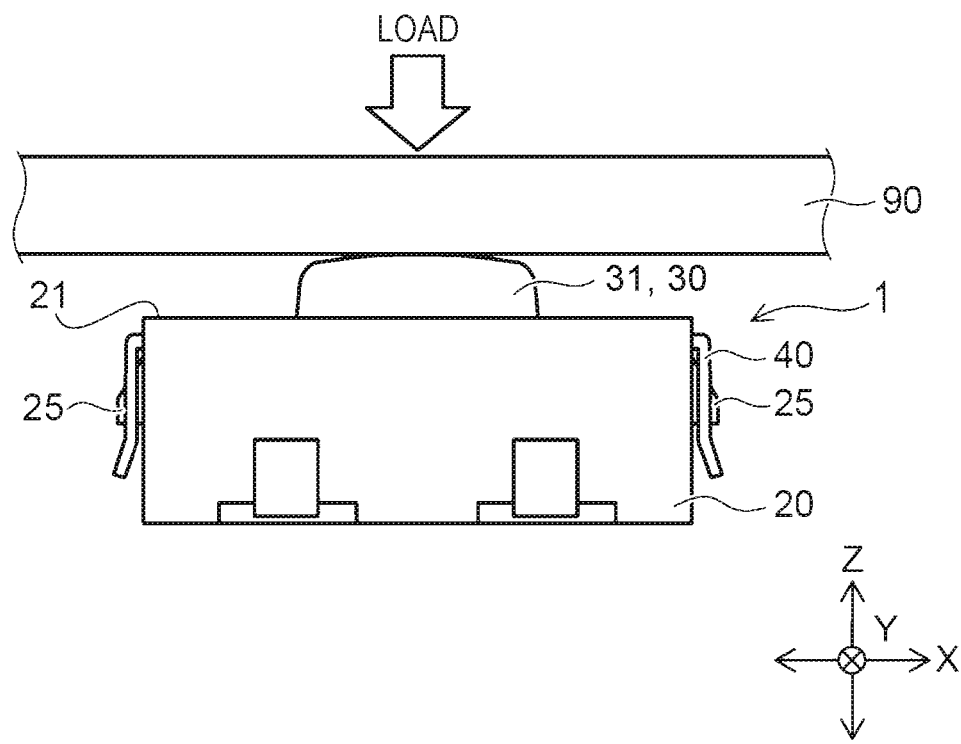
FIGS. 6A and 6B illustrate the operation of the load sensor device according to this embodiment.
Figure 6B:
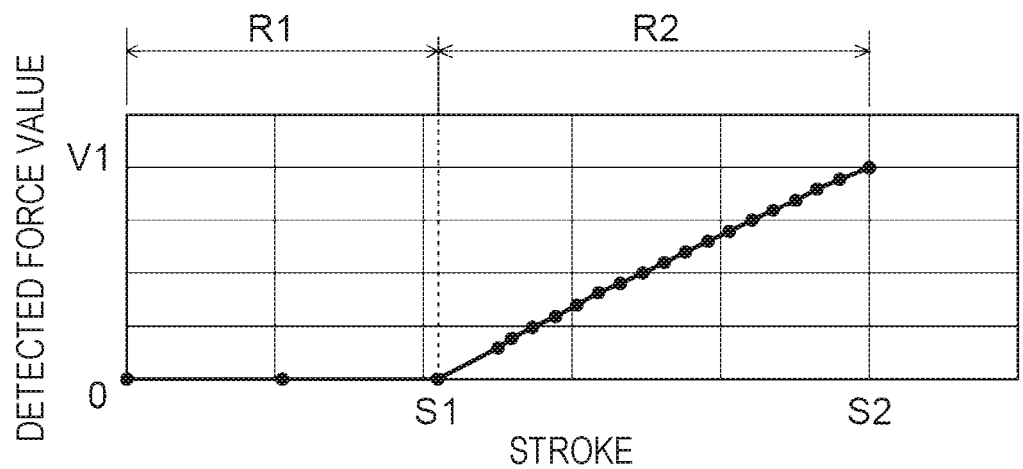

FIGS. 6A and 6B illustrate the operation of the load sensor device according to this embodiment. FIG. 6A illustrates a state where a load is applied to the load sensor device 1, and FIG. 6B illustrates an output example of the load sensor. In FIG. 6B, the abscissa axis denotes a stroke of a plate 90 in the Z direction, and the ordinate axis denotes an output value (relative value).

As shown in FIG. 6A, a load is applied to the elastic member 31 of the pressing member 30 of the load sensor device 1 via the plate 90. When the load is applied from the plate 90 to the elastic member 31 in the Z direction, the rigid presser 32 supported by the spring effect of the elastic supporter 33 is pressed in the Z direction.

Since the gap d is provided between the rigid presser 32 and the pressure receiver 11 of the load sensor 10, the load is not applied to the pressure receiver 11 until the rigid presser 32 comes into contact with the pressure receiver 11.

Therefore, as shown in FIG. 6B, an output does not occur in a range from when the load sensor device 1 starts to receive the load to when a predetermined stroke 51 is reached. This range is referred to as a pre-stroke range R1. In the pre-stroke range R1, the pressing member 30 strokes in a period from when the elastic supporter 33 elastically deforms in response to the load to when the rigid presser 32 comes into contact with the pressure receiver 11, but the load is not transmitted to the pressure receiver 11, so that the output value does not increase. The duration of the pre-stroke range R1 is settable in accordance with the gap d. Moreover, the load required for the pre-stroke is settable in accordance with the spring constant of the elastic supporter 33.

Subsequently, when the load is applied beyond the pre-stroke range R1, the output value increases in accordance with the stroke. This range is referred to as a force reception range R2. In the force reception range R2, the rigid presser 32 is in contact with the pressure receiver 11, so that the load is transmitted from the elastic member 31 to the pressure receiver 11 via the rigid presser 32. In accordance with the rigidity of the rigid presser 32 that comes into contact with the pressure receiver 11, the output value from the load sensor 10 increases substantially in proportion to the magnitude of the stroke (load). The output value increases to V1 in accordance with the stroke.

The force reception range R2 continues until the edge sections 21 of the housing 20 function as stoppers. Specifically, when the pressing member 30 is pressed and the plate 90 comes into abutment with the edge sections 21 of the housing 20, the pressing member 30 is not pressed any further. Accordingly, the stroke of the pressing member 30 stops at S2, and the output value does not increase any further, whereby an excessive load on the load sensor 10 is prevented.

Second Embodiment

Figure 8:
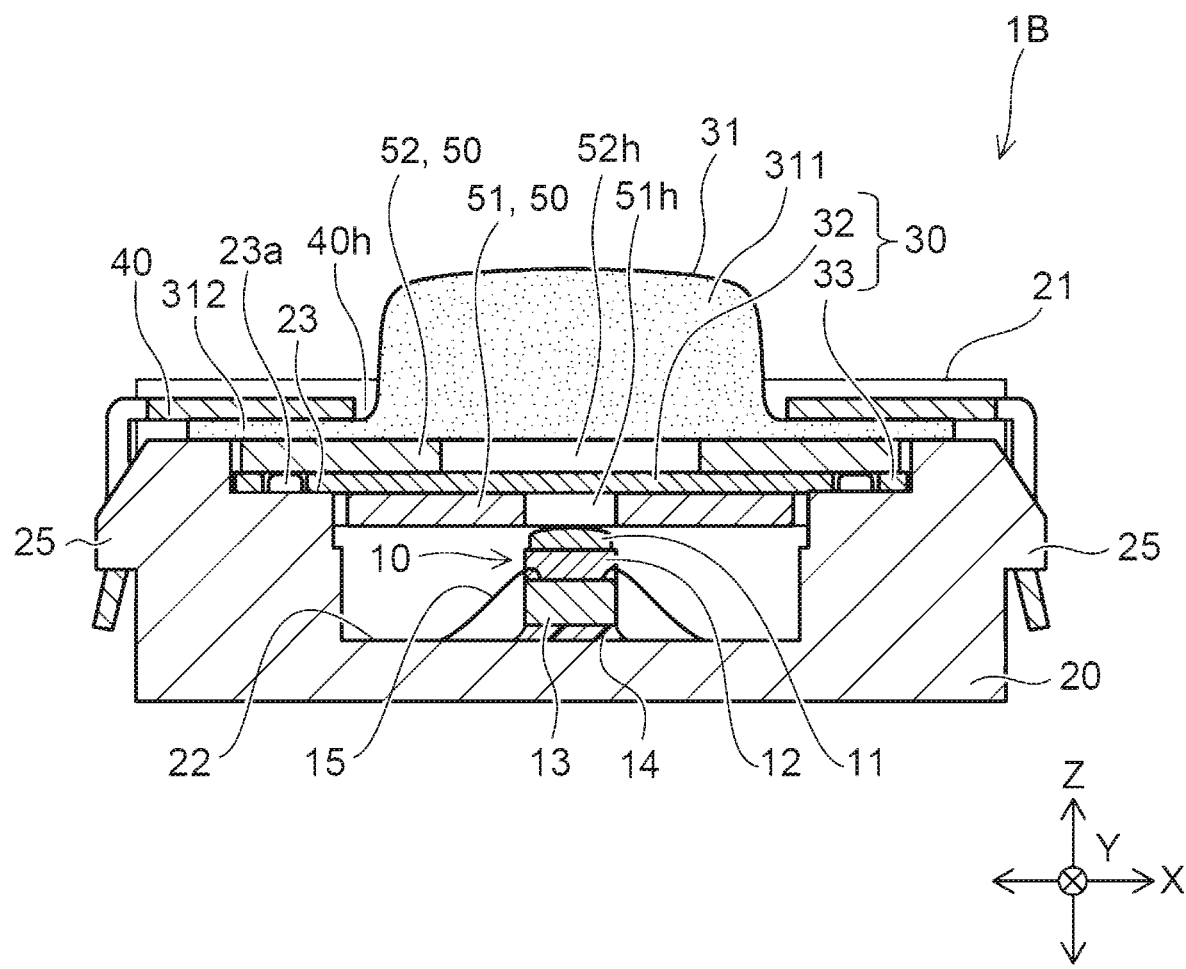
FIG. 8 is a cross-sectional view illustrating the configuration of the load sensor device according to the second embodiment.

FIG. 7 is an exploded perspective view of a load sensor device according to a second embodiment. FIG. 8 is a cross-sectional view illustrating the configuration of the load sensor device according to the second embodiment.

In a load sensor device 1B according to the second embodiment, the shock absorber 50 may have a second soft elasticity member 52. Specifically, the shock absorber 50 has the second soft elasticity member 52 disposed at a side where the elastic supporter 33 serving as the plate spring 330 faces the elastic member 31. As an alternative to the second embodiment in which the shock absorber 50 has both the first soft elasticity member 51 and the second soft elasticity member 52, the shock absorber 50 may have the second soft elasticity member 52 alone. Furthermore, the second soft elasticity member 52 and the elastic member 31 may be integrated with each other.

With the shock absorber 50 having the second soft elasticity member 52, when an impact is applied to the pressing member 30, the elastically-deforming elastic supporter 33 comes into contact with the second soft elasticity member 52, so that the elastic deformation of the elastic supporter 33 can be alleviated.

The second soft elasticity member 52 may have a second through-hole 52h. Accordingly, when a load is applied to the elastic member 31, the elastic member 31 or a member disposed between the elastic member 31 and the rigid presser 32 may come into contact with the rigid presser 32 via the second through-hole 52h. Specifically, even if the second soft elasticity member 52 is provided at the side where the plate spring faces the elastic member 31, the elastic member 31 or the member disposed between the elastic member 31 and the rigid presser 32 is capable of directly coming into contact with the rigid presser 32 via the second through-hole 52h, so that the load can be transmitted from the elastic member 31 to the pressing member 30 without the intervention of the second soft elasticity member 52.

Third Embodiment

Figure 9:
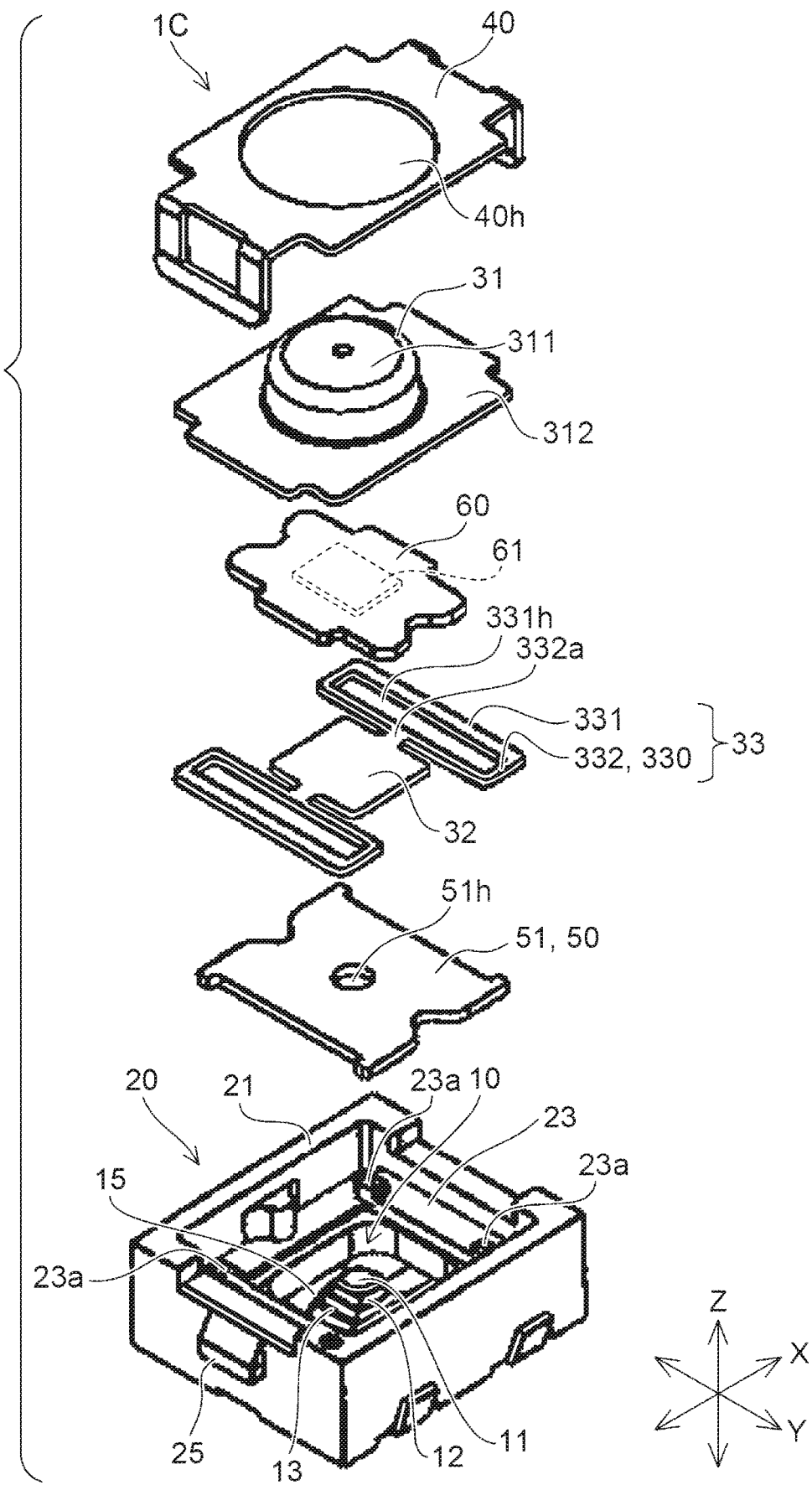
FIG. 9 is an exploded perspective view of a load sensor device according to a third embodiment.
Figure 10:
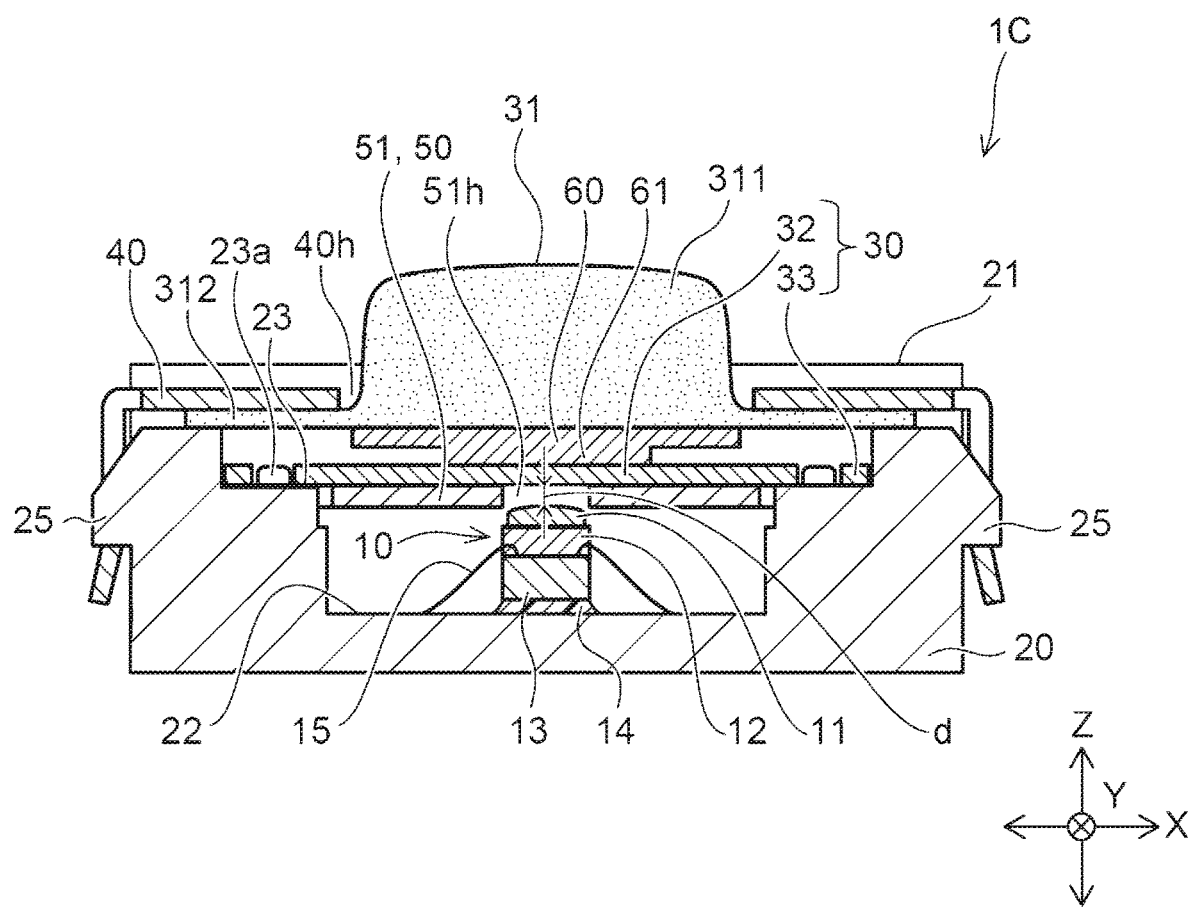
FIG. 10 is a cross-sectional view illustrating the configuration of the load sensor device according to the third embodiment.

FIG. 9 is an exploded perspective view illustrating the configuration of a load sensor device according to a third embodiment. FIG. 10 is a cross-sectional view illustrating the configuration of the load sensor device according to the third embodiment.

In addition to the configuration of the load sensor device 1 according to the first embodiment, a load sensor device 1C according to the third embodiment may include a rigid plate 60 between the elastic member 31 and the rigid presser 32. The rigid plate 60 has rigidity similar to that of the rigid presser 32 and may be composed of a stainless material similar to that of the rigid presser 32.

In the load sensor device 1 described above, the rigid presser 32 is directly pressed by the elastic member 31. In the load sensor device 1C, the load received by the elastic member 31 is transmitted to the rigid presser 32 via the rigid plate 60. The rigid plate 60 has a protrusion 61 at the side thereof facing the rigid presser 32 and can transmit a force to a central area of the rigid presser 32 without interfering with other components. Therefore, the load received by the elastic member 31 can be readily transmitted to the load sensor 10, thereby achieving enhanced sensitivity.

Fourth Embodiment

Figure 11:
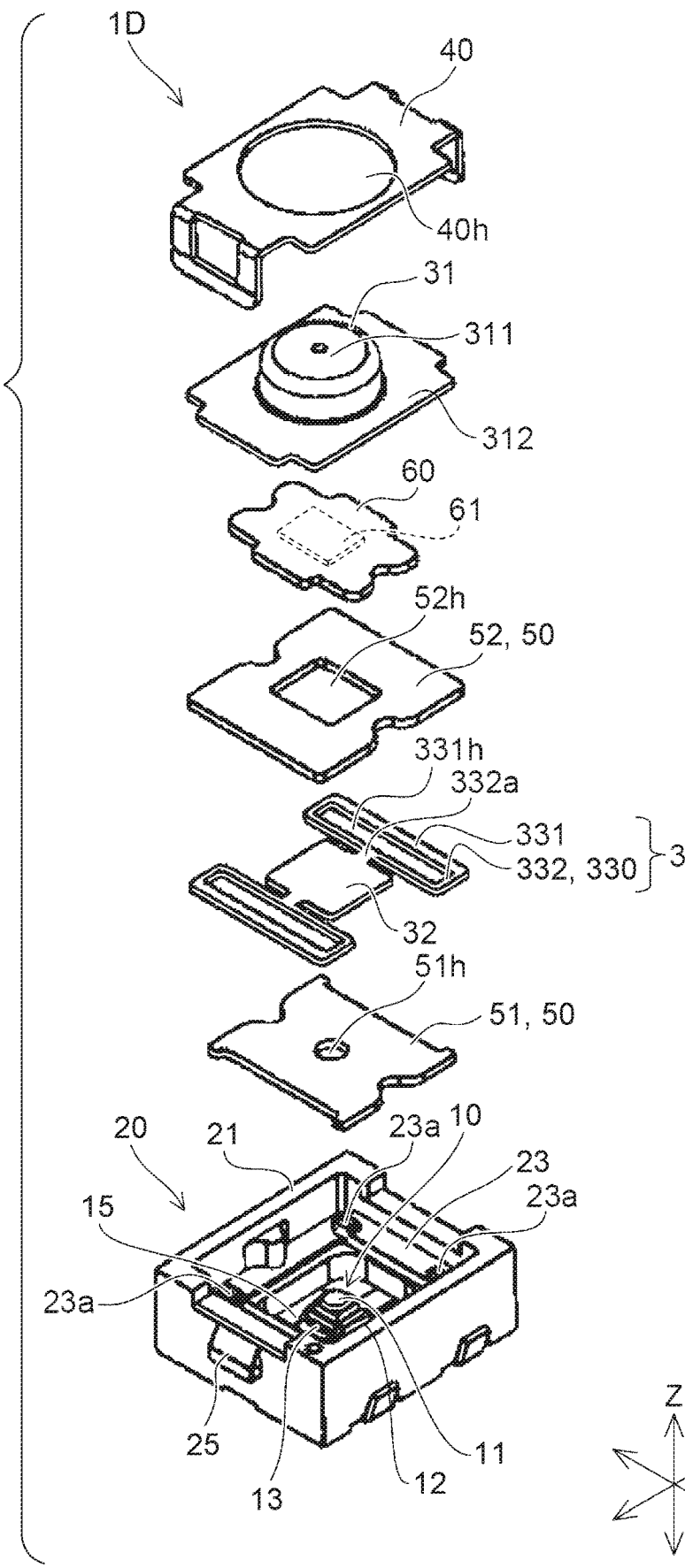
FIG. 11 is an exploded perspective view of a load sensor device according to a fourth embodiment.
Figure 12:
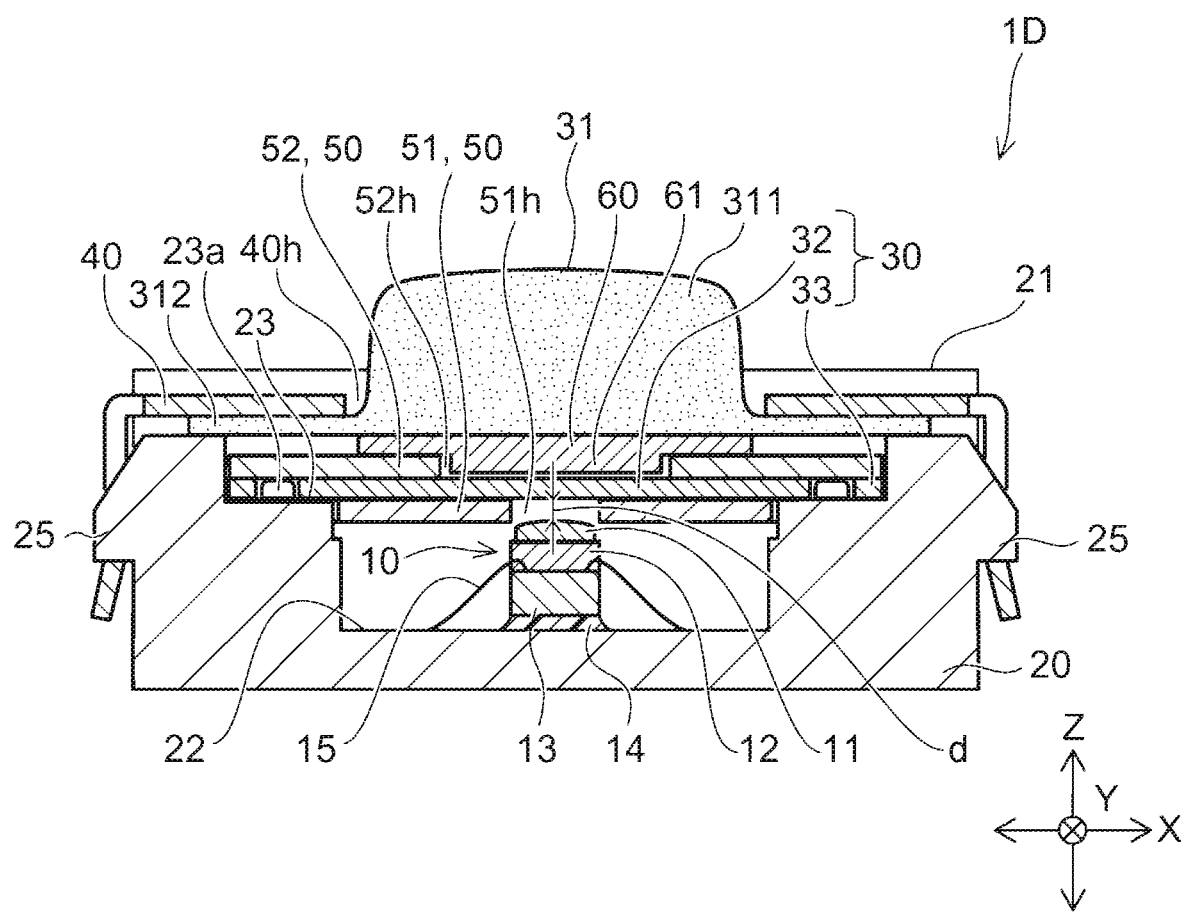
FIG. 12 is a cross-sectional view illustrating the configuration of the load sensor device according to the fourth embodiment.

FIG. 11 is an exploded perspective view illustrating the configuration of a load sensor device according to a fourth embodiment. FIG. 12 is a cross-sectional view illustrating the configuration of the load sensor device according to the fourth embodiment.

In addition to the configuration of the load sensor device 1B according to the second embodiment, a load sensor device 1D according to the fourth embodiment includes the rigid plate 60, similar to that in the third embodiment, between the elastic member 31 and the rigid presser 32. The protrusion 61 of the rigid plate 60 is disposed within the second through-hole 52h of the second soft elasticity member 52, so that the protrusion 61 is directly in contact with the rigid presser 32. Accordingly, the load sensor device 1D is similar to the load sensor device 1C according to the third embodiment in that the load received by the elastic member 31 is efficiently transmitted to the rigid presser 32 via the rigid plate 60. Therefore, the load received by the elastic member 31 is readily transmitted to the load sensor 10, thereby achieving enhanced sensitivity.

Fifth Embodiment

Figure 13:
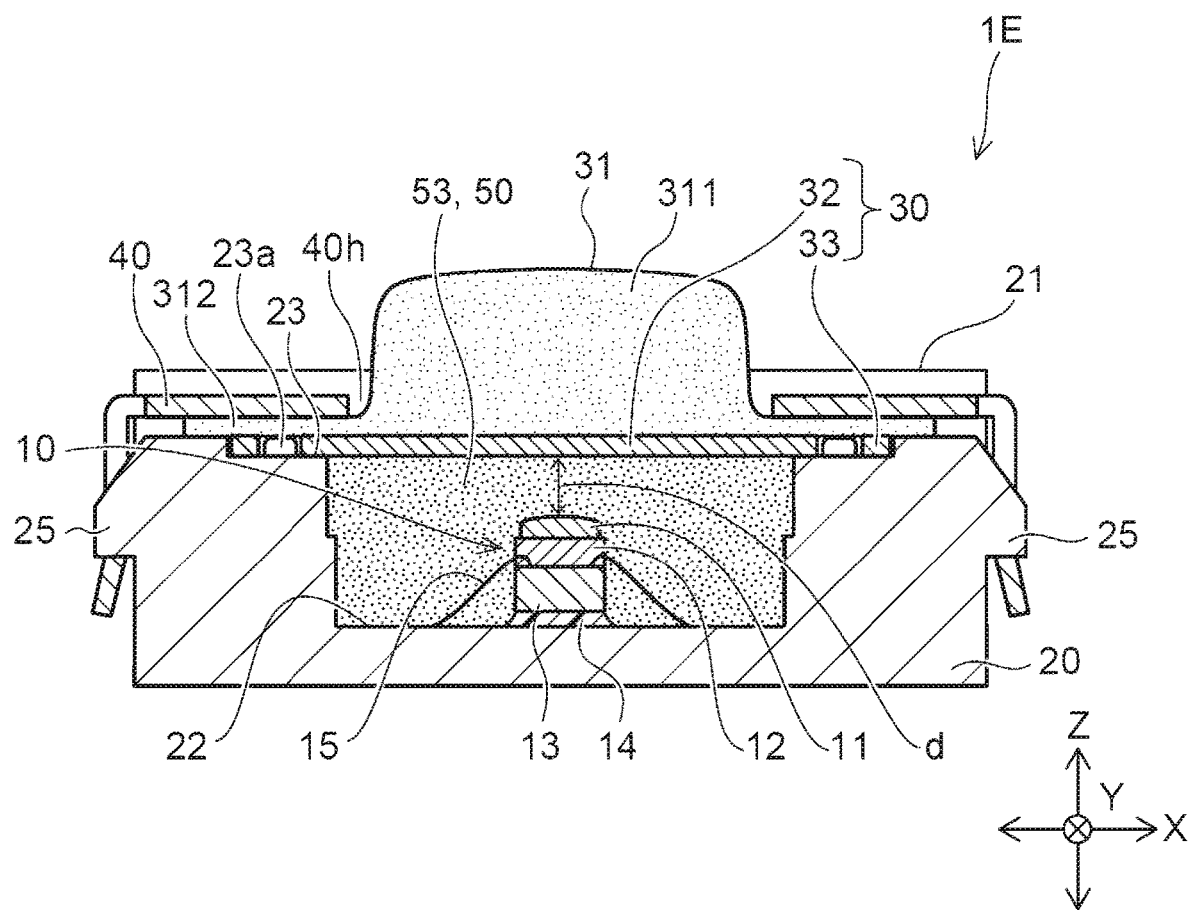
FIG. 13 is a cross-sectional view illustrating the configuration of a load sensor device according to a fifth embodiment.

FIG. 13 is a cross-sectional view illustrating the configuration of a load sensor device according to a fifth embodiment. In a load sensor device 1E according to the fifth embodiment, the shock absorber 50 may have a shock absorbable section (fluid material section 53) composed of a fluid material within the housing 20. Examples of the fluid material section 53 used include silicone gel, silicone oil, elastomer, or gelatinous or oily resin. The fluid material section 53 may be constituted by filling the accommodation section 22 of the housing 20 with the aforementioned gel or resin.

The fluid material section 53 may be provided such as to be constantly in contact with the elastic supporter 33 or to come into contact therewith when the elastic supporter 33 elastically deforms. Accordingly, when an impact is applied to the pressing member 30, the elastically-deforming elastic supporter 33 comes into contact with the fluid material section 53 so that the elastic deformation of the elastic supporter 33 is alleviated, whereby the displacement rate of the rigid presser 32 can be reduced.

Advantages of Shock Absorber

Next, the advantages of the shock absorber 50 used in the load sensor device 1 according to this embodiment will be described. In order to study the advantages of the shock absorber 50, a load test was performed on the load sensor device.

The load test involved applying a load (impact load) on the load sensor device by dropping a weight thereon from a height of about 9.2 cm, and subsequently measuring a change in the output from the load sensor device relative to a normal load. In the load test, weights dropped weighed 30 g, 50 g, 80 g, and 100 g. An initial value corresponds to a case where an impact load is not applied using a weight.

The items measured in the load test include sensitivity (mV/V/N) in the output of the load sensor device, an offset (mV/V), and a relative value with respect to an initial offset value. The sensitivity is an output per unit load. The offset is an output in a no-load state. The load test was performed on the load sensor device according to this embodiment equipped with the shock absorber 50 (examples 1 to 6 of the present invention), a load sensor device according to a comparative example not equipped with the shock absorber 50 (comparative example), and a load sensor device according to a reference example (reference example).

Table 1 indicates the configuration according to examples 1 to 3 of the present invention and values obtained from the load test. Table 2 indicates the configuration according to examples 4 to 6 of the present invention and values obtained from the load test.

TABLE 1

| | | SHOCK ABSORBER 50 | | | | | | |
|---|---|---|---|---|---|---|---|---|
| | ELASTIC MEMBER 31 | FIRST SOFT ELASTICITY MEMBER 51 | SECOND SOFT ELASTICITY MEMBER 52 | DIE-BOND RESIN 14 | WEIGHT g | SENSITIVITY mV/V/N | OFFSET mV/V | OFFSET RELATIVE VALUE |
| EXAMPLE 1 | 80 | 30 | N. A. | EPOXY | INITIAL | 2.49 | −2.26 | 1.0 |
| | | | | | 30 | 2.56 | −2.25 | 1.0 |
| | | | | | 50 | 2.70 | −2.25 | 1.0 |
| | | | | | 80 | 2.70 | −2.22 | 1.0 |
| | | | | | 100 | 2.45 | −26.00 | 11.5 |
| EXAMPLE 2 | 80 | 20 | 30 | EPOXY | INITIAL | 2.72 | −2.39 | 1.0 |
| | | | | | 30 | 2.77 | −2.43 | 1.0 |
| | | | | | 50 | 2.76 | −2.39 | 1.0 |
| | | | | | 80 | 2.78 | −2.35 | 1.0 |
| | | | | | 100 | 2.44 | −27.92 | 11.7 |
| EXAMPLE 3 | 80 | 20 | 20 | EPOXY | INITIAL | 2.72 | −2.08 | 1.0 |
| | | | | | 30 | 2.85 | −2.79 | 0.9 |
| | | | | | 50 | 2.85 | −2.80 | 0.9 |
| | | | | | 80 | 2.88 | −2.75 | 0.9 |
| | | | | | 100 | 2.70 | −16.03 | 5.2 |

TABLE 2

| | ELASTIC MEMBER 31 | SHOCK ABSORBER 50 | | DIE-BOND RESIN 14 | WEIGHT g | SENSITIVITY mV/V/N | OFFSET mV/V | OFFSET RELATIVE VALUE |
| --- | --- | --- | --- | --- | --- | --- | --- | --- |
| | | FIRST SOFT ELASTICITY MEMBER 51 | SECOND SOFT ELASTICITY MEMBER 52 | | | | | |
| EXAMPLE 4 | 50 | 30 | N. A. | EPOXY | INITIAL | 1.84 | −2.57 | 1.0 |
| | | | | | 30 | 1.88 | −2.57 | 1.0 |
| | | | | | 50 | 2.43 | −1.02 | 0.4 |
| | | | | | 80 | 2.49 | −1.11 | 0.4 |
| | | | | | 100 | 2.44 | −8.97 | 3.5 |
| EXAMPLE 5 | 50 | 20 | 30 | EPOXY | INITIAL | 2.47 | −2.51 | 1.0 |
| | | | | | 30 | 2.50 | −2.56 | 1.0 |
| | | | | | 50 | 2.56 | −2.56 | 1.0 |
| | | | | | 80 | 2.64 | −2.57 | 1.0 |
| | | | | | 100 | 2.66 | −1.96 | 0.8 |
| EXAMPLE 6 | 50 | 20 | 20 | EPOXY | INITIAL | 2.50 | −2.32 | 1.0 |
| | | | | | 30 | 2.53 | −2.34 | 1.0 |
| | | | | | 50 | 2.60 | −2.33 | 1.0 |
| | | | | | 80 | 2.66 | −2.27 | 1.0 |
| | | | | | 100 | 2.57 | −10.74 | 4.6 |

In the configuration of the load sensor device according to each of examples 1 to 3 of the present invention indicated in Table 1, the hardness of the elastic member 31 is 80 (Shore A hardness, which is similarly used hereinafter to indicate the hardness), and the die-bond resin 14 is epoxy resin. The load sensor device according to each of examples 1 to 3 of the present invention includes the rigid plate 60 between the elastic member 31 and the rigid presser 32.

The configuration of the load sensor device according to example 1 of the present invention corresponds to the configuration of the load sensor device 1C according to the third embodiment (see FIGS. 9 and 10). Specifically, in example 1 of the present invention, the first soft elasticity member 51 alone is provided as the shock absorber 50 and has a hardness of 30.

The configuration of the load sensor device according to each of examples 2 and 3 of the present invention corresponds to the configuration of the load sensor device 1D according to the fourth embodiment (see FIGS. 11 and 12).

Specifically, in example 2 of the present invention, the first soft elasticity member 51 and the second soft elasticity member 52 are provided as the shock absorber 50, the first soft elasticity member 51 has a hardness of 20, and the second soft elasticity member 52 has a hardness of 30. Furthermore, in example 3 of the present invention, the first soft elasticity member 51 and the second soft elasticity member 52 are provided as the shock absorber 50, the first soft elasticity member 51 has a hardness of 20, and the second soft elasticity member 52 has a hardness of 20.

In the configuration of the load sensor device according to each of examples 4 to 6 of the present invention indicated in Table 2, the hardness of the elastic member 31 is 50. With regard to the other components, example 4 of the present invention is the same as example 1 of the present invention, example 5 of the present invention is the same as example 2 of the present invention, and example 6 of the present invention is the same as example 3 of the present invention.

Figure 14:
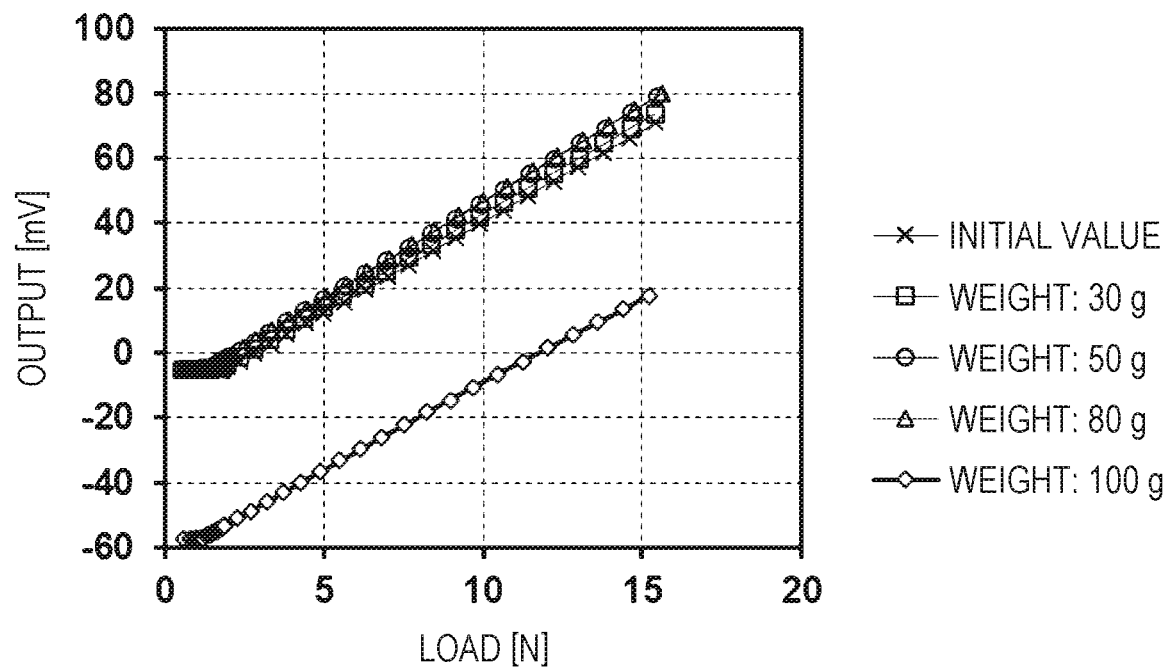
FIG. 14 illustrates results of a load test in example 1 of the present invention.
Figure 15:
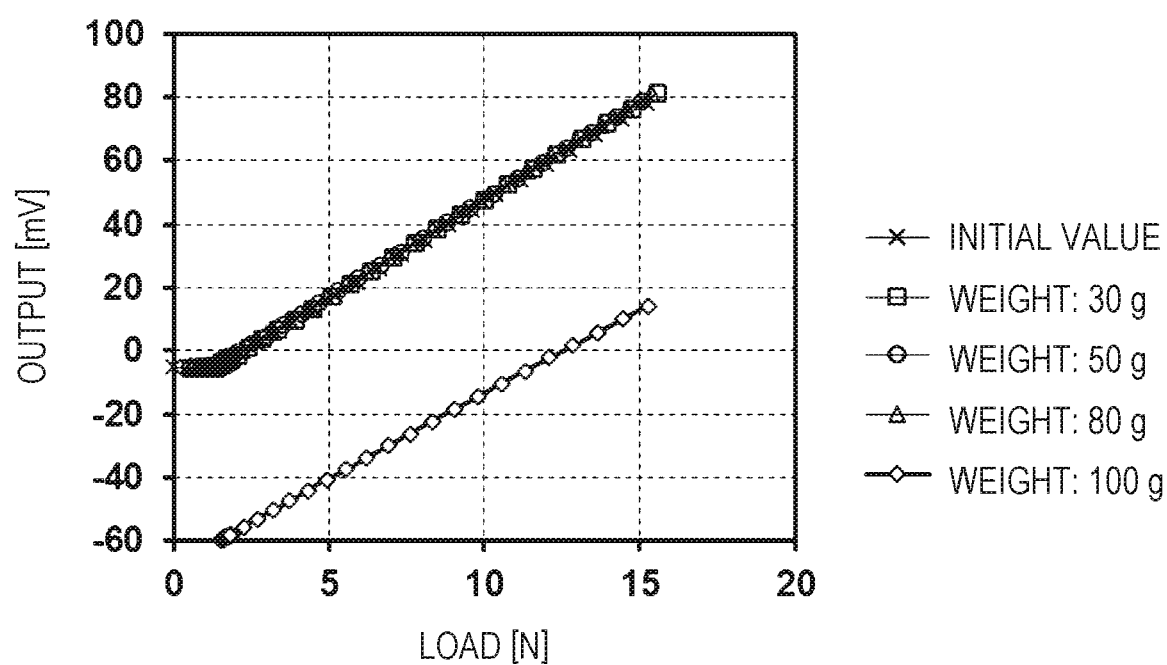
FIG. 15 illustrates results of the load test in example 2 of the present invention.
Figure 16:
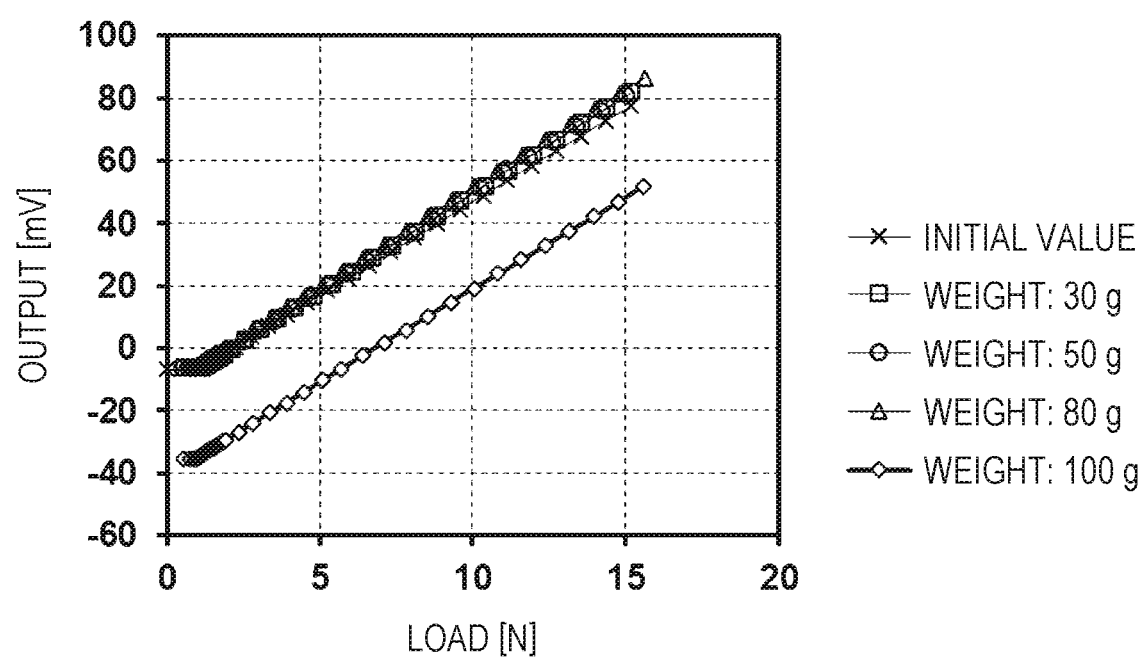
FIG. 16 illustrates results of the load test in example 3 of the present invention.

FIG. 14 illustrates results of the load test in example 1 of the present invention. FIG. 15 illustrates results of the load test in example 2 of the present invention. FIG. 16 illustrates results of the load test in example 3 of the present invention.

In FIGS. 14 to 16, the abscissa axis indicates a normal load applied to the load sensor device, and the ordinate axis indicates an output of the load sensor device. As shown in FIGS. 14 to 16, in a case where impact loads were applied by using weights of 30 g, 50 g, and 80 g, an output change (i.e., a gradient and an output value) substantially equal to the initial value was obtained. On the other hand, in a case where an impact load was applied by using a weight of 100 g, it is apparent that the gradient of the output change relative to a normal load was substantially similar to that of the initial value, but an offset occurred in the direction in which the output value decreased. Therefore, even when the impact load using the weight of 80 g was received, the displacement rate of the rigid presser 32 was reduced in accordance with the shock absorption effect by the shock absorber 50, thereby resulting in an ability to alleviate the impact force transmitted to the pressure receiver 11.

An "offset relative value" in each of Table 1 and Table 2 is a relative value obtained as a result of dividing the offset amount at each weight by the offset amount at the initial value. As indicated in Table 1 and Table 2, in examples 1 to 4 and example 6 of the present invention, the offset relative value was substantially 1 when the weight was smaller than 100 g, and the offset relative value deviated from 1 only when the weight was 100 g. In example 5 of the present invention, the offset relative value was substantially 1 in all the weights up to 100 g.

Figure 17:
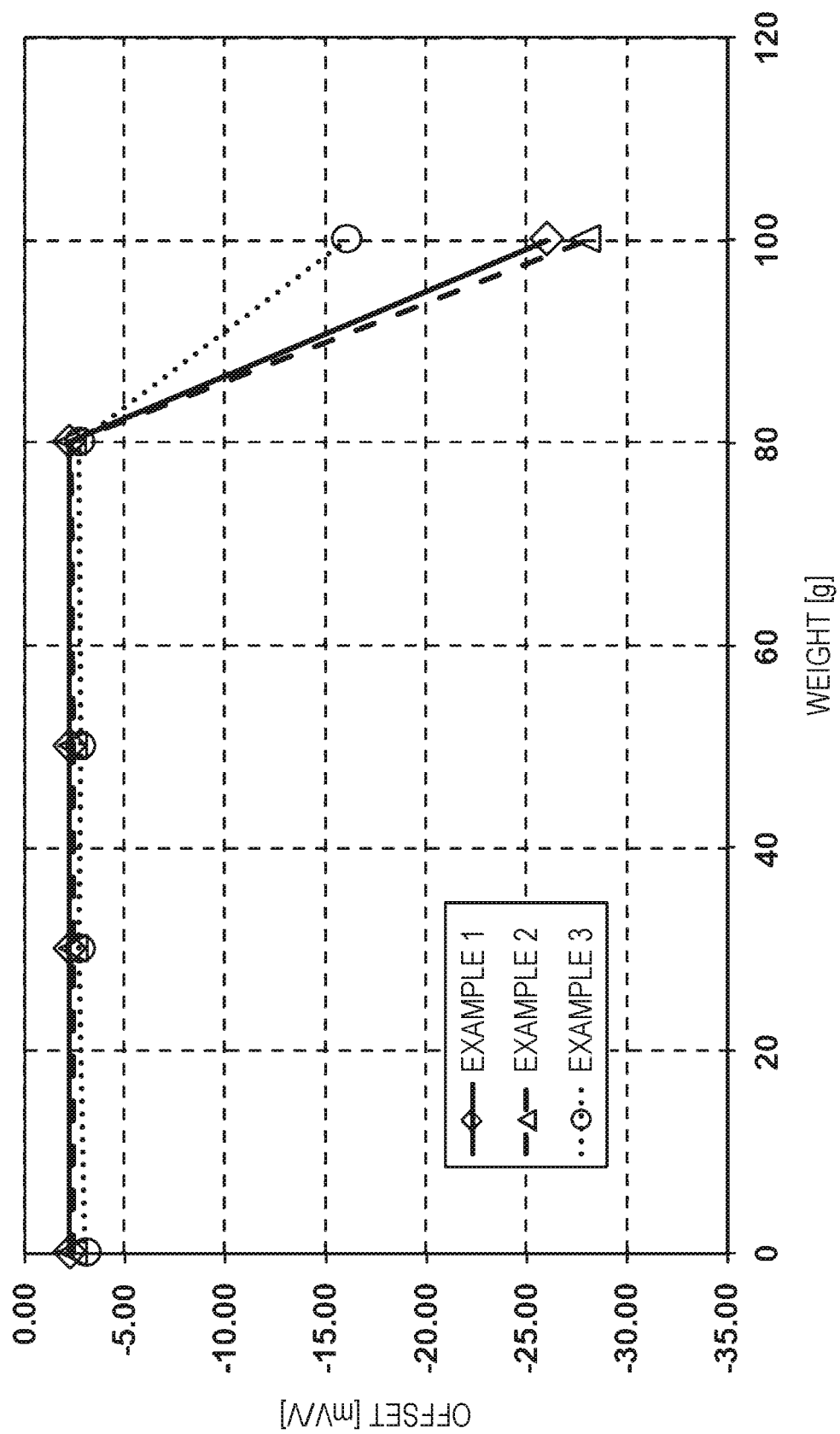
FIG. 17 illustrates results of the load test in examples 1 to 3 of the present invention.
Figure 18:
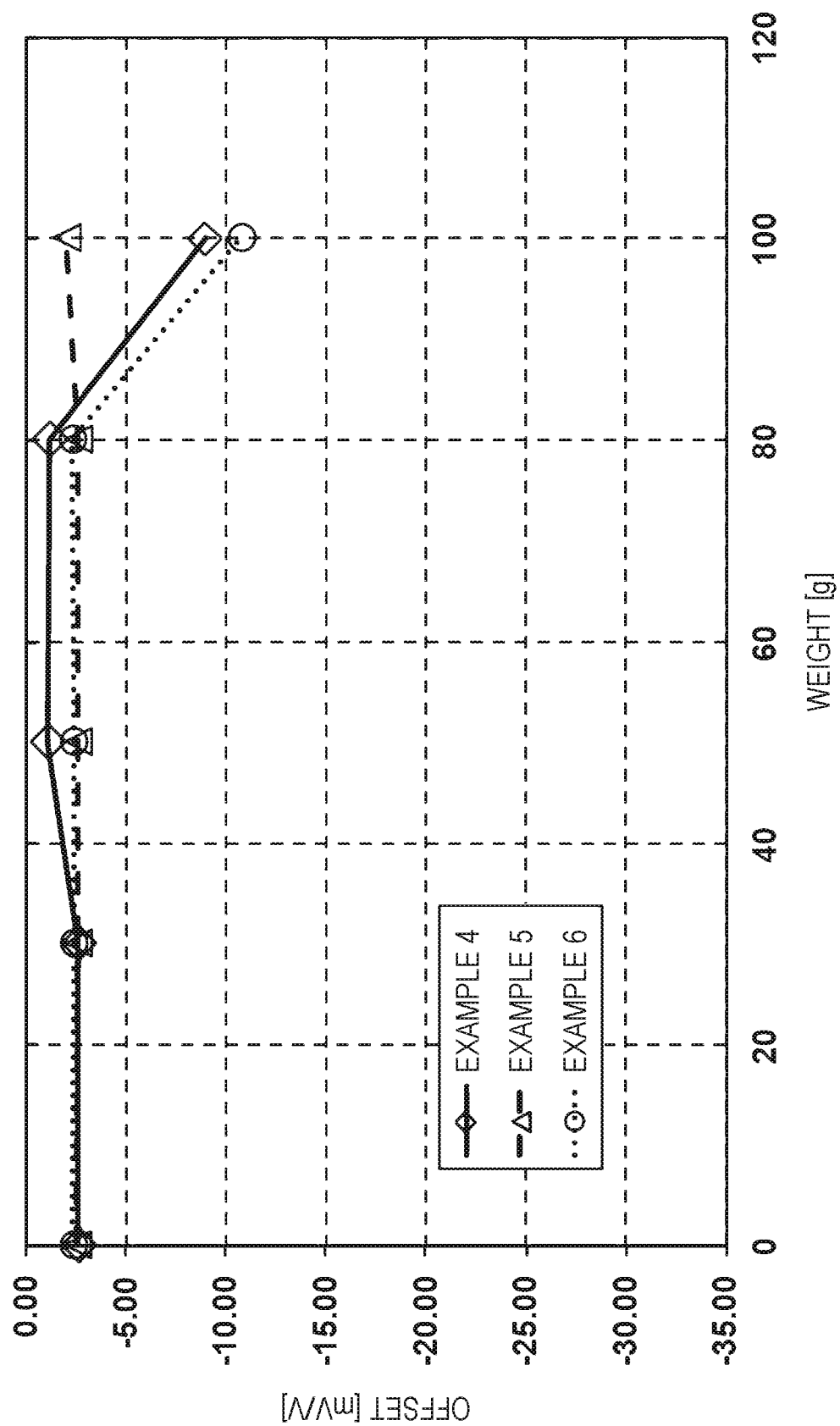
FIG. 18 illustrates results of the load test in examples 4 to 6 of the present invention.

FIG. 17 illustrates results of the load test in examples 1 to 3 of the present invention corresponding to Table 1. FIG. 18 illustrates results of the load test in examples 4 to 6 of the present invention corresponding to Table 2. In FIGS. 17 and 18, the abscissa axis indicates each weight in the load test, and the ordinate axis indicates an offset.

In any of examples 1 to 6 of the present invention, it is apparent that the offset of the output value hardly changed even when an impact load up to the weight of 80 g was received. With regard to example 6 of the present invention, the offset hardly changed even when an impact load was applied by using the weight of 100 g.

Table 3 indicates the configuration according to the comparative example and values obtained from the load test.

TABLE 3

| | ELASTIC MEMBER 31 | SHOCK ABSORBER 50 ||| WEIGHT g | SENSITIVITY mV/V/N | OFFSET mV/V | OFFSET RELATIVE VALUE |
| | | FIRST SOFT ELASTICITY MEMBER 51 | SECOND SOFT ELASTICITY MEMBER 52 | DIE-BOND RESIN 14 | | | | |
|---|---|---|---|---|---|---|---|---|
| COMPARATIVE EXAMPLE 1 | 80 | N. A. | N. A. | EPOXY | INITIAL | 2.85 | −2.09 | 1.0 |
| | | | | | 30 | 2.66 | −14.25 | 6.8 |
| | | | | | 50 | 2.59 | −14.39 | 6.9 |
| | | | | | 80 | 2.54 | −18.81 | 9.0 |
| | | | | | 100 | 2.49 | −22.06 | 10.6 |

In the configuration of the load sensor device according to the comparative example indicated in Table 3, the hardness of the elastic member 31 is 80, and the die-bond resin 14 is epoxy resin. The load sensor device according to the comparative example does not include the first soft elasticity member 51 or the second soft elasticity member 52 in the shock absorber 50.

Figure 19:
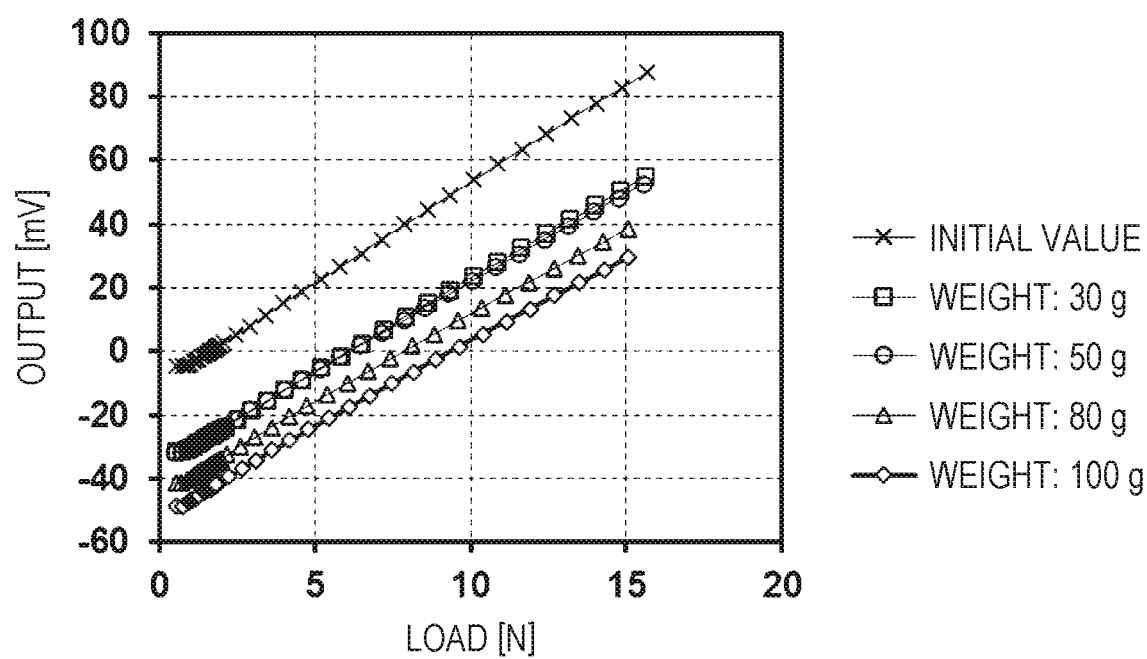
FIG. 19 illustrates results of the load test in a comparative example.
Figure 20:
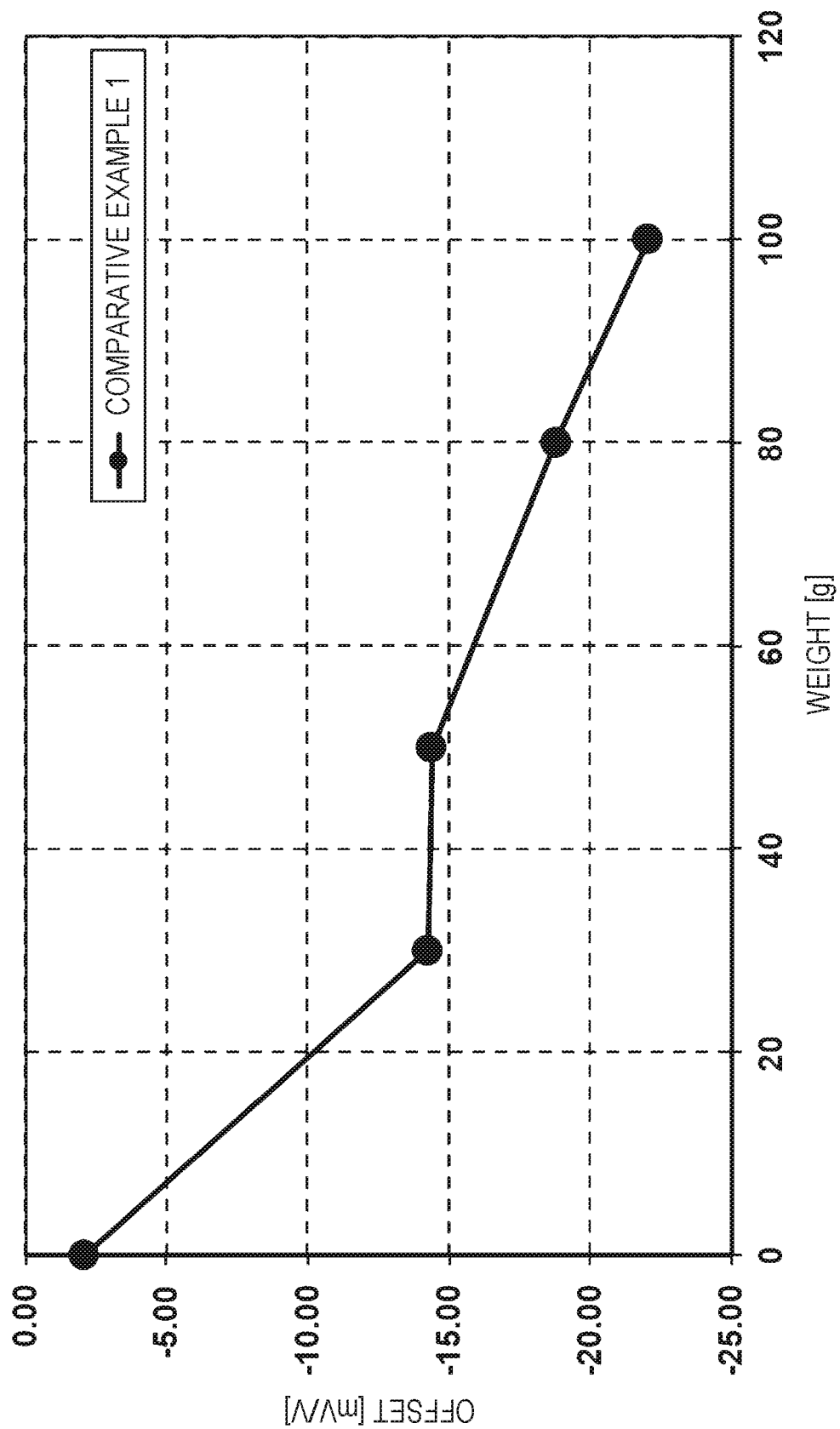
FIG. 20 illustrates results of the load test in the comparative example.

FIGS. 19 and 20 illustrate results of the load test in the comparative example. In FIG. 19, the abscissa axis indicates a normal load applied to the load sensor device, and the ordinate axis indicates an output of the load sensor device. In FIG. 20, the abscissa axis indicates each weight in the load test, and the ordinate axis indicates an offset.

As shown in FIGS. 19 and 20, in the load sensor device according to the comparative example, it is apparent that an offset occurred in the direction in which the output value decreased as the weight increased in a case where impact loads were applied by using weights of 30 g, 50 g, 80 g, and 100 g. In Table 3, it is confirmed that the offset relative value significantly deviated from 1 even when the weight was 30 g, and that the offset relative value tends to increase with increasing weight.

In the load sensor device according to each of examples 1 to 6 of the present invention equipped with the shock absorber 50, it is confirmed from the results of the above load test that the impact resistance was higher than that of the load sensor device according to the comparative example not equipped with the shock absorber 50. This is conceivably due to the fact that the elastic deformation of the elastic supporter 33 is alleviated by the shock absorber 50 when an impact load is applied and that rapid contact (collision) of the rigid presser 32 with the pressure receiver 11 is avoided by reducing the displacement rate of the rigid presser 32.

On the other hand, in the load sensor device according to the comparative example not equipped with the shock absorber 50, an offset in the output value occurred even with a relatively small impact load. In particular, in a case where the load sensor 10 obtains an output by using the bridge circuit constituted of the plurality of piezo-resistive elements 122, the balance in resistance values of the bridge circuit tends to become lost as a result of the impact load applied to the pressure receiver 11. Thus, it is conceivable in the load sensor device according to the comparative example not equipped with the shock absorber 50 that the bridge circuit is significantly damaged even with a small impact load and an offset in the output value appears prominently.

Table 4 indicates the configuration according to each of reference examples 1 and 2 and values obtained from the load test.

TABLE 4

| | ELASTIC MEMBER 31 | SHOCK ABSORBER 50 ||| WEIGHT g | SENSITIVITY mV/V/N | OFFSET mV/V | OFFSET RELATIVE VALUE |
| | | FIRST SOFT ELASTICITY MEMBER 51 | SECOND SOFT ELASTICITY MEMBER 52 | DIE-BOND RESIN 14 | | | | |
|---|---|---|---|---|---|---|---|---|
| REFERENCE EXAMPLE 1 | 80 | N. A. | N. A. | SILICON | INITIAL | 2.66 | −2.74 | 1.0 |
| | | | | | 30 | 2.65 | −2.61 | 1.1 |
| | | | | | 50 | 2.64 | −2.61 | 1.1 |
| | | | | | 80 | 2.67 | −2.40 | 1.0 |
| | | | | | 100 | 2.46 | −25.56 | 11.0 |
| REFERENCE EXAMPLE 2 | 50 | N. A. | N. A. | SILICON | INITIAL | 2.28 | −2.90 | 1.0 |
| | | | | | 30 | 2.27 | −2.91 | 1.0 |
| | | | | | 50 | 2.34 | −2.49 | 0.9 |
| | | | | | 80 | 2.31 | −1.25 | 0.4 |
| | | | | | 100 | 2.18 | −18.91 | 6.5 |

In the load sensor device according to each of reference examples 1 and 2 indicated in Table 4, the die-bond resin 14 is silicone. The load sensor device according to each of reference examples 1 and 2 does not include the first soft elasticity member 51 or the second soft elasticity member 52 in the shock absorber 50.

Figure 21:
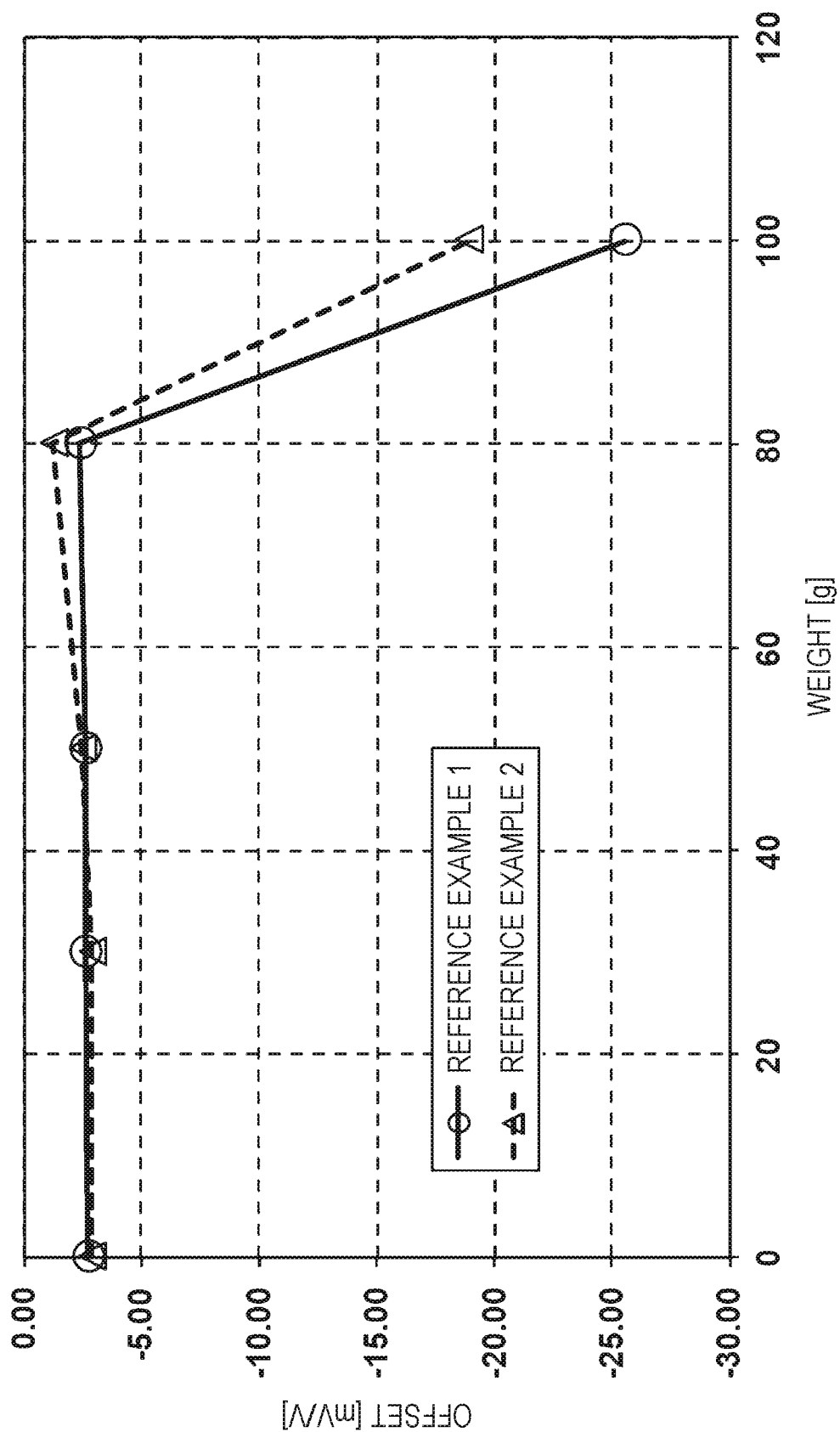
FIG. 21 illustrates results of the load test in reference examples 1 and 2.

In reference example 1, the hardness of the elastic member 31 is 80. In reference example 2, the hardness of the elastic member 31 is 50. FIG. 21 illustrates results of the load test in reference examples 1 and 2 corresponding to Table 4. In FIG. 21, the abscissa axis indicates each weight in the load test, and the ordinate axis indicates an offset.

In reference examples 1 and 2, it is apparent that the offset of the output value hardly changed even when an impact load up to the weight of 80 g was received. This result possibly indicates that an effect similar to the case where the shock absorber 50 is provided is achieved (i.e., the impact resistance is enhanced) due to the die-bond resin 14 being composed of a soft material.

As described above, the embodiments can provide the load sensor devices 1, 1B, 1C, 1D, and 1E that can achieve both high detection accuracy and excellent impact resistance.

Although the embodiments have been described above, the present invention is not to be limited to these examples. For example, a skilled person may add a structural element to, delete a structural element from, or change the design of a structural element in each of the above embodiments, where appropriate, or may combine the features of the configuration examples of the embodiments, where appropriate. Such examples are to be included in the scope of the present invention so long as they include the gist of the present invention.

What is claimed is:

1. A load sensor device comprising:
   a load sensor having a pressure receiver;
   a housing accommodating the load sensor;
   an elastic member for receiving a load and being pressed in a load application direction towards the load sensor, the elastic member having a first elastic modulus;
   a pressing member provided between the elastic member and the load sensor, the pressing member receiving the load from the elastic member and thereby applying a pressure onto the pressure receiver, the pressing member including:
     a rigid presser for coming into contact with the pressure receiver of the load sensor, the rigid presser having a second elastic modulus higher than the first elastic modulus; and
     an elastic supporter supporting the rigid presser on the housing such that a gap is provided between the rigid presser and the pressure receiver in a state where no load is applied to the elastic member, the elastic supporter including a plate spring extending from the rigid presser in a direction intersecting the load application direction, and being configured to elastically deform to reduce the gap between the rigid presser and the pressure receiver when the load is applied to the elastic member; and
   a shock absorber including a first soft elasticity member disposed on a side of the pressing member facing the load sensor, the first soft elasticity member allowing the rigid presser to come into direct contact with the pressure receiver, while the elastic supporter coming into contact with the first elasticity member, at least when the elastic supporter deforms, thereby shock absorber alleviates elastic deformation of the elastic supporter.

2. The load sensor device according to claim 1, wherein the plate spring is provided integrally with the rigid presser.

3. The load sensor device according to claim 1,
   wherein the first soft elasticity member has a first through-hole, through which the rigid presser comes into contact with the pressure receiver when the load is applied to the elastic member.

4. The load sensor device according to claim 1,
   wherein the shock absorber further includes a second soft elasticity member disposed on a side of the plate spring facing the elastic member.

5. The load sensor device according to claim 4,
   wherein the second soft elasticity member has a second through-hole, through which the elastic member or a member disposed between the elastic member and the rigid presser comes into contact with the rigid presser when the load is applied to the elastic member.

6. The load sensor device according to claim 1,
   wherein the shock absorber includes a portion formed of a shock absorbable material having fluidity within the housing.

7. The load sensor device according to claim 1,
   wherein the housing has a stopper configured to regulate an amount of a deformation of the elastic member in a load application direction when the load is applied to the elastic member.

8. The load sensor device according to claim 1,
   wherein a periphery of the pressing member is secured to the housing.

9. The load sensor device according to claim 1,
   wherein, when viewed from the load application direction, the rigid presser entirely overlaps a load receiving portion of the elastic member, and the pressure receiver of the load sensor entirely overlaps the rigid presser.

10. The load sensor device according to claim 1,
    wherein the load sensor further includes:
      a displacement section configured to be displaced in accordance with a load received by the pressure receiver, and
      a plurality of piezo-resistive elements configured to electrically detect a displacement amount of the displacement section.

11. The load sensor device according to claim 1,
    wherein the shock absorber is provided in contact with the elastic supporter.

12. The load sensor device according to claim 11,
    wherein the shock absorber includes gelatinous resin attached to the elastic supporter.

13. The load sensor device according to claim 1, further comprising:
    a rigid plate provided between the elastic member and the rigid presser.

14. The load sensor device according to claim 1, wherein the pressure receiver is formed of a silicon or silicon compound material.

* * * * *